United States Patent
Lee et al.

(10) Patent No.: US 8,279,966 B2
(45) Date of Patent: *Oct. 2, 2012

(54) SYMBOL-LEVEL COMBINING FOR MULTIPLE INPUT MULTIPLE OUTPUT (MIMO) SYSTEMS WITH HYBRID AUTOMATIC REPEAT REQUEST (HARQ) AND/OR REPETITION CODING

(75) Inventors: Jungwon Lee, Cupertino, CA (US); Woong Jun Jang, Stanford, CA (US); Leilei Song, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,410

(22) Filed: Sep. 19, 2011

(65) Prior Publication Data

US 2012/0069935 A1 Mar. 22, 2012

Related U.S. Application Data

(63) Continuation of application No. 11/781,208, filed on Jul. 20, 2007, now Pat. No. 8,027,402.

(60) Provisional application No. 60/820,419, filed on Jul. 26, 2006, provisional application No. 60/822,294, filed on Aug. 14, 2006, provisional application No. 60/822,821, filed on Aug. 18, 2006.

(51) Int. Cl.
*H04B 7/02* (2006.01)

(52) U.S. Cl. ........ 375/267; 375/299; 375/347; 455/101; 455/132

(58) Field of Classification Search .................. 375/267, 375/299, 347; 455/101, 132
See application file for complete search history.

(56) References Cited

U.S. PATENT DOCUMENTS

| | | |
|---|---|---|
| 6,185,258 B1 | 2/2001 | Alamouti et al. |
| 6,567,388 B1 | 5/2003 | Tomcik et al. |
| 6,687,492 B1 | 2/2004 | Sugar et al. |
| 6,778,619 B2 | 8/2004 | Zangi et al. |
| 6,868,520 B1 | 3/2005 | Fauconnier |
| 6,967,598 B2 | 11/2005 | Mills |
| 7,194,237 B2 | 3/2007 | Sugar et al. |
| 7,295,624 B2 | 11/2007 | Onggosanusi et al. |
| 7,362,815 B2 | 4/2008 | Lindskog et al. |
| 7,366,247 B2 | 4/2008 | Kim et al. |

(Continued)

FOREIGN PATENT DOCUMENTS

EP 1271835 1/2003

(Continued)

OTHER PUBLICATIONS

Wu, J. et al., "The Performance of TCM 16-QAM with Equalization, Diversity, and Slow Frequency Hopping for Wideband Mobile Communications", 1998, Personal, Indoor and Mobile Radio Communication, vol. 3, pp. 1346-1350.

(Continued)

*Primary Examiner* — Juan A Torres

(57) ABSTRACT

Systems and methods are provided for decoding signal vectors in multiple-input multiple-output (MIMO) systems, where the receiver has received one or more signal vectors from the same transmitted vector. The symbols of the received signal vectors are combined, forming a combined received signal vector that may be treated as a single received signal vector. The combined signal vector is then decoded using a maximum-likelihood decoder. In some embodiments, the combined received signal vector may be processed prior to decoding. Systems and methods are also provided for computing soft information from a combined signal vector based on a decoding metric. Computationally intensive calculations can be extracted from the critical path and implemented in preprocessors and/or postprocessors.

20 Claims, 24 Drawing Sheets

U.S. PATENT DOCUMENTS

| | | |
|---|---|---|
| 7,382,841 B2 | 6/2008 | Ohtaki et al. |
| 7,428,269 B2 | 9/2008 | Sampath et al. |
| 7,489,746 B1 | 2/2009 | Awater et al. |
| 7,502,432 B2 | 3/2009 | Catreux et al. |
| 7,526,038 B2 | 4/2009 | McNamara |
| 7,539,274 B2 | 5/2009 | Catreux et al. |
| 7,548,592 B2 | 6/2009 | Wight |
| 7,554,985 B2 | 6/2009 | Ihm et al. |
| 7,573,806 B2 | 8/2009 | Ihm et al. |
| 7,590,204 B2 | 9/2009 | Monsen |
| 7,593,489 B2 | 9/2009 | Koshy et al. |
| 7,649,953 B2 | 1/2010 | Bauch |
| 7,729,411 B2 | 6/2010 | Wang et al. |
| 7,742,550 B2 | 6/2010 | Olesen et al. |
| 7,826,557 B2 | 11/2010 | Li et al. |
| 7,885,364 B2 | 2/2011 | Ito |
| 2003/0012318 A1 | 1/2003 | Piirainen |
| 2004/0049725 A1 | 3/2004 | Golitschek et al. |
| 2004/0181419 A1 | 9/2004 | Davis et al. |
| 2005/0117520 A1 | 6/2005 | Miyoshi |
| 2005/0141644 A1 | 6/2005 | Sadowsky |
| 2006/0107167 A1 | 5/2006 | Jeong et al. |
| 2006/0251156 A1 | 11/2006 | Grant et al. |
| 2006/0274836 A1 | 12/2006 | Sampath et al. |
| 2007/0127603 A1 | 6/2007 | Niu et al. |
| 2007/0268988 A1 | 11/2007 | Hedayat et al. |
| 2008/0025427 A1 | 1/2008 | Lee et al. |
| 2008/0025429 A1 | 1/2008 | Lee et al. |
| 2008/0025443 A1 | 1/2008 | Lee et al. |
| 2008/0037670 A1 | 2/2008 | Lee et al. |
| 2008/0063103 A1 | 3/2008 | Lee et al. |
| 2008/0144733 A1 | 6/2008 | ElGamal et al. |
| 2008/0198941 A1 | 8/2008 | Song et al. |
| 2009/0031183 A1 | 1/2009 | Hoshino et al. |
| 2009/0063106 A1 | 3/2009 | Burg et al. |
| 2009/0080579 A1 | 3/2009 | Fujii |
| 2009/0307558 A1 | 12/2009 | Lee et al. |
| 2010/0014601 A1 | 1/2010 | Mo et al. |

FOREIGN PATENT DOCUMENTS

| | | |
|---|---|---|
| EP | 1501210 | 1/2005 |
| EP | 1 608 081 | 12/2005 |
| WO | WO 00/52873 | 9/2000 |
| WO | WO 02/067491 | 8/2002 |

OTHER PUBLICATIONS

Jang et al. "An Efficient Symbol-Level Combining Scheme for MIMO Systems With Hybrid ARQ", IEEE Transactions on Wireless Communications, vol. 8, pp. 2443-2451, May 26, 2009.

Cioffi, John et al. "Generalized decision-feedback equalization for packet transmission with ISI and gaussian noise", Communications, computation, control and signal processing: a tribute to Thomas Kailath, pp. 79-127 (1997).

Gharavi-Alkhansari, Mohammad et al. "Constellation Space Invariance of Space-Time Block Codes with Application to Optimal Antenna Subset Selection", Signal Processing Advances in Wireless Communications, pp. 269-273 (2003).

Ginis, George et al. "On the Relation Between V-BLAST and the GDFE", IEEE Communications Letters, vol. 5, No. 9, pp. 364-366 (Sep. 2001).

Hassibi, Babak "An Efficient Square-Root Algorithm for BLAST", IEEE International Conference on Acoustics, Speech, and Signal Processing, vol. 2, pp. 737-740 (2000).

Theofilakos, Panagiotis et al. "Frobenius Norm Based Receive Antenna Subarray Formation for MIMO Systems", First European Conference on Antennas and Propagation, pp. 1-5 (2006).

Wolniansky, P.W. et al. "V-BLAST: An Architecture for Realizing Very High Data Rates Over the Rich-Scattering Wireless Channel", URSI International Symposium on Signals, Systems, and Electronics, pp. 295-300 (1998).

Wübben, Dirk et al. "MMSE Extension of V-BLAST based on Sorted QR Decomposition" IEEE 58th Vehicular Technology Conference, vol. 1, pp. 508-512 (2003).

Acolatse, Kodzovi et al. "An Alamouti-based Hybrid-ARQ Scheme for MIMO Systems" 14th IST Mobile and Wireless Communications, Dresden (Jun. 2005).

Acolatse, Kodzovi et al. "Space Time Block Coding HARQ scheme for Highly Frequency Selective Channels" 2007 IEEE International Conference on Communications, pp. 4416-4420 (Jun. 24, 2007).

Alamouti, Siavash, M. "A Simple Transmit Diversity Technique for Wireless Communications." IEEE Journal on Select Areas in Communications, vol. 16, No, 8. (Oct. 1998).

Chiang, Ping-Hung et al. "Performance of 2IMO Differentially Transmit-Diversity Block Coded OFDM Systems in Doubly Selective Channels" Global Telecommunications Conference, 2005, pp. 3768-3773 (Nov. 11, 2005).

Kim, Woo Tai et al. Performance of STBC with Turbo Code in HARQ Scheme for Mobile Communication System. Telecommunications, 2003. ICT 2003. 10th International Conference, pp. 85-59 (Feb. 23, 2003).

Koike T., et al. "Hybrid ARQ scheme suitable for coded MIMO transmission" Communications, IEEE International Conference, Paris, France, pp. 2919-2923 (Jun. 20, 2004).

Nagareda R et al. "OFDM mobile packet transmission system with multiuser detection and metric combining ARQ" Vehicular Technology Conference, 2004 VTC2004-Fall. 2004 IEEE 60th Los Angeles, CA USA, pp. 709-713 (Sep. 26, 2004).

Samra H, Zhi Ding "New MIMO ARQ protocols and joint detection via sphere decoding" IEEE Transactions on Signal Processing [online], pp. 473-482 (Feb. 28, 2006).

Samra Harvino, Ding Zhi "Sphere decoding for retransmission diversity in MIMO flat-fading channels" ICASSP IEEE Int. Conf. Acoust. Speech Signal Process [online], pp. 585-588 (May 17, 2004).

Schmitt M. P. "Improved retransmission strategy for hybrid ARQ schemes employing TCM" Wireless Communications and Networking Conference, 1999 IEEE New Orleans, LA, pp. 1226-1228 (Sep. 21, 1999).

Tirkkonen, O et al. "Square-Matrix Embeddable Space-Time Block Codes for Complex Signal Constellations," IEEE Trans. Info. Theory, vol. 48, pp. 384-395 (Feb. 2002).

Tong, Wen et al. Soft packet combing for STC re-transmission to improve H-ARQ performance in MIMO mode. Proposal for IEEE 802.16 Broadband Wireless Access Working Group, pp. 1-5 (Jul. 7, 2004).

Chase, David. "Code Combining—A Maximum-Likelihood Decoding Approach for Combining an Arbitrary Number of Noisy Packets" *IEEE Transactions on Communications*, vol. Comm-33 No. 5, pp. 385-393 (May 1985).

802.16e: IEEE Standard for Local and metropolitan area networks Part 16: Air Interface for Fixed and Mobile Broadband Wireless Access Systems Amendment for Physical and Medium Access Control Layers for Combined Fixed and Mobile Operation in Licensed Bands, pp. 1-3, 485-495, 635, and 649-650 (Feb. 2006).

Onggosanusi, Eko N. et al. "Hybrid ARQ Transmission and Combining for MIMO systems" *IEEE*, 2003.

Krishnaswamy, Dilip, et al. "Multi-Level Weighted Combining of Retransmitted Vectors in Wireless Communications." *IEEE VTC.* Sep. 2006.

Rontogiannis, "An Adaptive Decision Feedback Equalizer for Time-Varying Frequency," IEEE 7th Workshop on Selective MIMO Channels Signal Processing Advances in Wireless Communications, 2006, SPAWC '06, Publication Date: Jul. 2-5, 2006 pp. 1-5.

Nakajima, "Throughput of turbo coded hybrid ARQ using single-carrier MIMO multiplexing," 2005 IEEE 61st Vehicular Technology Conference, 2005, VTC 2005 spring, vol. 1 Publication Year: 2005, pp. 610-614 vol. 1.

Mi-Kyung Oh, "Efficient hybrid ARQ with space-time coding and low-complexity decoding," IEEE International Conference on Acoustics, Speech, and Signal Processing, 2004, Proceedings, (ICASSP '04) vol. 4 Publication Year: 2004 , pp. iv-589-iv-592 vol. A.

Davis, "Scaled and decoupled Cholesky and QR decompositions with application to spherical MIMO detection," WCNC 2003. 2003 IEEE Wireless Communications and Networking, 2003, vol. 1 Publication Year: 2003 , pp. 326-331 vol. 1.

Arkhipov, "OFDMA-CDM performance enhancement by combining H-ARQ and interference cancellation," IEEE Journal on Selected Areas in Communications, vol. 24, Issue: 6 pp. 1199-1207 Published May 30, 2006.

Nakajima, "Iterative Joint PIC and 2D MMSE-FDE for Turbo-coded HARQ with SC-MIMO Multiplexing," VTC 2006—Spring. IEEE 63rd Vehicular Technology Conference, 2006, Publication Date May 7-10, 2006 vol. 5 pp. 2503-2507.

Liu, "A new efficient MIMO detection algorithm based on Cholesky decomposition,"The 6th International Conference on Advanced Communication Technology, 2004 vol. 1 Publication Year: 2004 , pp. 264-268.

Dekorsy, "A cutoff rate based cross-layer metric for MIMO-HARQ transmission," PIMRC 2005. IEEE 16th International Symposium on Personal, Indoor and Mobile Radio Communications, 2005, vol. 4, Publication Year: 2005 pp. 2166-2170 vol. 4.

Jang et al., "Optimal Combining Schemes for MIMO Systems with Hybrid ARQ", ISIT 2007, IEEE International Symposium, Jun. 24-29, 2007, pp. 2286-2290.

$$\begin{bmatrix} y_1 \\ \vdots \\ y_{N_r} \end{bmatrix}_i = \begin{bmatrix} h_{11} & \cdots & h_{1N_t} \\ \vdots & \cdots & \vdots \\ h_{N_r,1} & \cdots & h_{N_r,N_t} \end{bmatrix}_i \begin{bmatrix} x_1 \\ \vdots \\ x_{N_t} \end{bmatrix} + \begin{bmatrix} n_1 \\ \vdots \\ n_{N_r} \end{bmatrix}_i$$

$$\mathbf{y}_i = H_i \mathbf{x} + \mathbf{n}_i$$

FIG. 5

SYMBOL-LEVEL COMBINING FOR MULTIPLE INPUT MULTIPLE OUTPUT (MIMO) SYSTEMS WITH HYBRID AUTOMATIC REPEAT REQUEST (HARQ) AND/OR REPETITION CODING

CROSS-REFERENCE TO RELATED APPLICATIONS

This present disclosure is a continuation of U.S. application Ser. No. 11/781,208, filed on Jul. 20, 2007, which claims priority under 35 U.S.C. §119(e) to U.S. Provisional Application Nos. 60/820,419, filed Jul. 26, 2006, 60/822,294, filed Aug. 14, 2006, and 60/822,821, filed Aug. 18, 2006.

BACKGROUND OF THE INVENTION

This invention relates to a technique for decoding a received signal vector in a multiple-input multiple-output (MIMO) data transmission or storage system, where the receiver may receive multiple instances of the same transmitted signal vector.

In a data transmission or storage system, it is desirable for information, often grouped in packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and receiver, and of their respective components.

There are many strategies for designing the transmitter and receiver. When the channel characteristics are known, the transmitter and receiver often implement signal processing techniques, such as transmitter precoders and receiver equalizers, to reduce or remove the effects caused by the channel and effectively recover the transmitted signal. Intersymbol interference (ISI) is one example of a channel effect that may be approximately eliminated using signal processing.

However, not all sources of signal corruption are caused from deterministic sources such as ISI. Non-deterministic sources, such as noise sources, may also affect the signal. Due to noise and other factors, signal processing techniques may not be entirely effective at eliminating adverse channel effects on their own. Therefore, designers often add redundancy in the data stream in order to correct errors that occur during transmission. The redundancy added to the data stream is determined based on an error correction code, which is another design variable. Common error correction codes include Reed-Solomon and Golay codes.

One straightforward way to implement a code is to use forward error correction (FEC). The transmitter encodes the data according to an error correction code and transmits the encoded information. Upon reception of the data, the receiver decodes the data using the same error correction code, ideally eliminating any errors. Therefore, "decoding" is hereinafter referred to as a method for producing an estimate of the transmitted sequence in any suitable form (e.g., a binary sequence, a sequence of probabilities, etc.)

Another way to implement a code for error correction is to use automatic repeat request (ARQ). Unlike FEC, ARQ schemes use error-detecting rather than error-correcting codes. The ARQ transmitter encodes data based on an error-detecting code, such as a cyclic redundancy check (CRC) code. After decoding the data based on the error-detecting code, if an error is detected, the receiver sends a request to the transmitter to retransmit that codeword. Thus, ARQ protocols require a forward channel for communication from transmitter to receiver and a back channel for communication from receiver to transmitter. Ultimately, the receiver will not accept a packet of data until there are no errors detected in the packet.

Finally, FEC and ARQ may be combined into what is known as hybrid automatic repeat request (HARQ). There are at least three standard HARQ protocols. HARQ type-I typically uses a code that is capable of both error-correction and error-detection. For example, a codeword may be constructed by first protecting the message with an error-detecting code, such as a CRC code, and then further encoding the CRC-protected message with an error-correcting code, such as a Reed-Solomon, Golay, convolutional, turbo, or low-density parity check (LDPC) code. When the receiver receives such a code, it first attempts FEC by decoding the error correction code. If, after error detection, there are still errors present, the receiver will request a retransmission of that packet. Otherwise, it accepts the received vector.

HARQ type-II and type-III are different from HARQ type-I, because the data sent on retransmissions of a packet are not the same as the data that was sent originally. HARQ type-II and type-III utilize incremental redundancy in successive retransmissions. That is, the first transmission uses a code with low redundancy. The code rate of a code is defined as the proportion of bits in the vector that carry information and is a metric for determining the throughput of the information. Therefore, the low redundancy code used for the first transmission of a packet has a high code rate, or throughput, but is less powerful at correcting errors. If errors are detected in the first packet, the second transmission is used to increase the redundancy, and therefore the error correcting capability, of the code. For example, if the first transmission uses a code with a code rate of 0.80, a retransmission may add enough extra redundancy to reduce the overall code rate to 0.70. The redundancy of the code may be increased by transmitting extra parity bits or by retransmitting a subset of the bits from the original transmission. If each retransmission can be decoded by itself, the system is HARQ type-III. Otherwise, the system is HARQ type-II.

SUMMARY OF THE INVENTION

Accordingly, systems and methods for reliable transmission in multiple-input multiple-output systems are disclosed, where a receiver obtains multiple signal vectors from the same transmit signal and combines them prior to decoding.

The transmitter, which has $N_t$ outputs, may send an $N_t$-dimensional signal vector to the receiver. The receiver, which has $N_r$ inputs, may receive an $N_r$-dimensional signal vector corresponding the $N_t$-dimensional transmit vector. In accordance with one aspect of the invention, the transmitter sends the same signal vector multiple times to the receiver according to some protocol. Two protocols that may be used are HARQ type-I and repetition coding, or a combination of the two.

It is beneficial for an ARQ or HARQ receiver to utilize data from multiple transmissions of a packet, because even packets that contain errors carry some amount of information about the transmitted packet. However, due to system complexity, and in particular decoder complexity, many practical schemes only use data from a small, fixed number of transmissions. Therefore, the present invention provides systems and methods for effectively utilizing information from an arbitrary number of transmitted packets that does not drastically increase the complexity of the system.

In one embodiment of the present invention, when the receiver has N≧1 received signal vectors corresponding to a common transmit signal vector, the receiver combines the symbols of the received signal vectors. That is, the receiver combines symbols of the N received signal vectors that correspond to the same symbol of the common transmit signal vector. This technique is referred to as symbol-level combining. The signal vectors may be combined by weighted addition of the symbols. In some embodiments, the weights may be chosen to maximize the signal-to-noise ratio at the receiver, a technique that may be referred to as maximal-ratio combining (MRC). Symbol-level combining produces a combined signal vector of the same dimension as the common transmit signal vector. The combined signal vector can be modeled as a single received vector, affected by some channel, represented by a combined channel response matrix, and some noise components, referred to as the combined noise. The combined noise may or may not be white noise. That is, the noise may or may not have a distribution with a flat power spectral density. If the combined noise is white, then the combined signal vector may be directly decoded by a decoder, such as a maximum-likelihood (ML) decoder.

However, in some embodiments, the noise of the combined received signal vector is not white. In these embodiments, the combined signal vector may be processed by a signal processor that whitens the noise. The signal processor may use channel information obtained from a channel preprocessor that operates on the combined channel matrix. After the combined signal vector is processed, the processed combined vector may be decoded by a decoder, such as an ML decoder. The ML decoder may also use channel information obtained from the channel preprocessor. For example, the decoding metric calculated by the decoder may be $\|y'-\tilde{H}^{1/2}x\|^2$. In some embodiments, the signal processor may additionally process the combined signal vector in order to reduce the decoding complexity of the system.

In some embodiments of the present invention, a channel preprocessor may perform a Cholesky factorization of a combined channel matrix. In particular, if the combined channel matrix is $\tilde{H}$, the preprocessor may decompose $\tilde{H}$ into a lower triangular matrix L, and an upper triangular matrix L*. To whiten the noise of a combined signal vector combined using MRC, a signal processor may multiply the combined received signal vector by $L^{-1}$. The resulting decoding metric is $\|L^{-1}\tilde{y}_N-L^*x\|^2$. Because L* is an upper triangular matrix rather than a full matrix, such as $\tilde{H}$, the decoding complexity may be reduced considerably.

In accordance with another aspect of the present invention, a decoding strategy is provided for decoding a combined signal vector based on a decoding metric. The decoding metric may be factored into two parts: 1) a simplified decoding metric which may be a function of channel information and x, the common transmit signal vector being determined, and 2) a modifier that may be function of channel information. For example, if the decoding metric is $\|L^{-1}\tilde{y}_N-L^*x\|^2$ for a 2-input, 2-output MIMO system, also referred to as a 2×2 system, the simplified decoding metric may be given by $\tilde{D}=\|\hat{L}^{-1}Y-\sqrt{h_{11}^{(2)}}\tilde{L}^*X\|^2$ and the modifier may be given by $$\frac{1}{h_{11}h_{11}^{(2)}}.$$

The channel information in the simplified decoding metric may be computed by a preprocessor. A simplified LLR, using the information from the preprocessor and the simplified decoding metric, may be calculated at substantially the same time as the modifier. Then, the simplified modifier and the simplified LLR may be combined using a postprocessor. This decoding strategy is advantageous because it removes computation from the most time-intensive and/or complex calculation in the decoder, the calculation that is repeatedly performed (e.g., $\|y'-\tilde{H}^{1/2}x\|^2$ that is performed for all valid values of x).

In some embodiments, the simplified decoding metric may be a linear approximation of the decoding metric. For example, the simplified decoding metric may be $\tilde{D}=\|\hat{L}^{-1}Y-\sqrt{h_{11}^{(2)}}\tilde{L}^*X\|^2$. The modifier, in this case, may be adjusted to $$\frac{1}{\sqrt{h_{11}}\sqrt{h_{11}^{(2)}}}.$$

The linear simplified decoding metric is significantly less complicated to implement, because the computation may be symbol-by-symbol based rather than vector-by-vector based. Furthermore, if the decoder is a hard decoder, the simplified LLR may be directly mapped to a hard value. Therefore, the modifier may not be calculated, saving even more in decoding complexity or decoding speed.

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which:

FIG. 5 is a vector model of the system in FIG. 1;

DETAILED DESCRIPTION

The disclosed invention provides a technique in a multiple-input multiple-output data transmission or storage system to decode a signal vector at a receiver, where the receiver may receive multiple signal vectors from the same transmitted signal vector.

Figure 1:
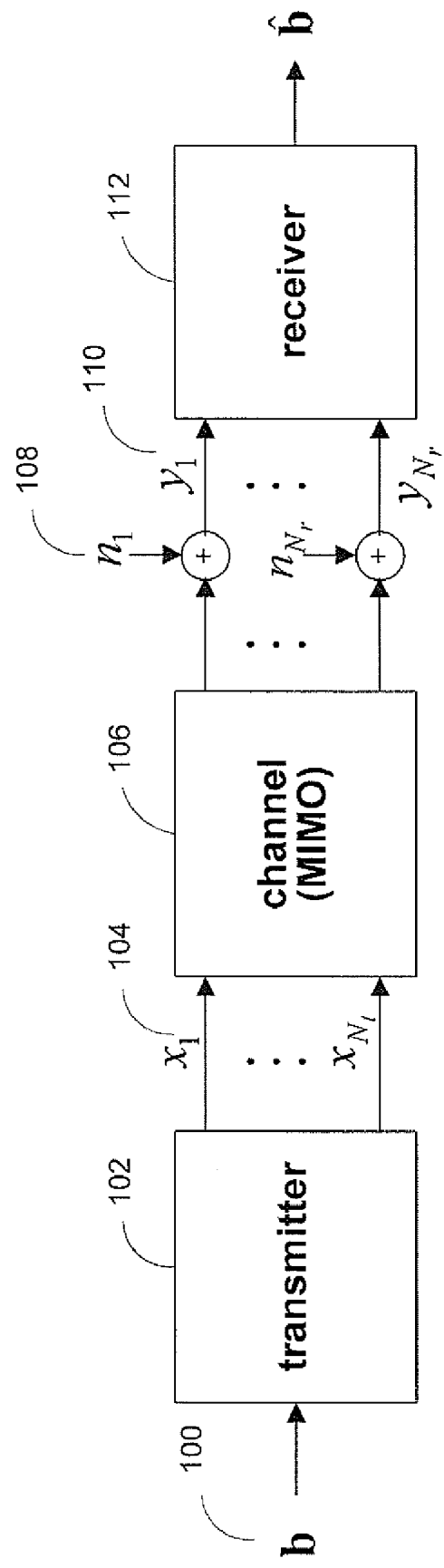
FIG. 1 is a high level block diagram of a multiple-input multiple-output data transmission or storage system.

FIG. 1 shows an illustration of a basic data transmission or storage system in accordance with one embodiment of the present invention. Data, typically grouped into packets, is sent from transmitter 102 to receiver 112. During transmission, the signals may be altered by a transmission medium, represented by channel 106, and additive noise sources 108. Transmitter 102 has $N_t$ outputs 104 and receiver 112 has $N_r$ inputs 110, so channel 106 is modeled as a multiple-input multiple-output (MIMO) system with $N_t$ inputs and $N_r$ outputs. The $N_t$ input and $N_r$ output dimensions may be implemented using multiple time, frequency, or spatial dimensions, or any combination of such dimensions.

Figure 2:
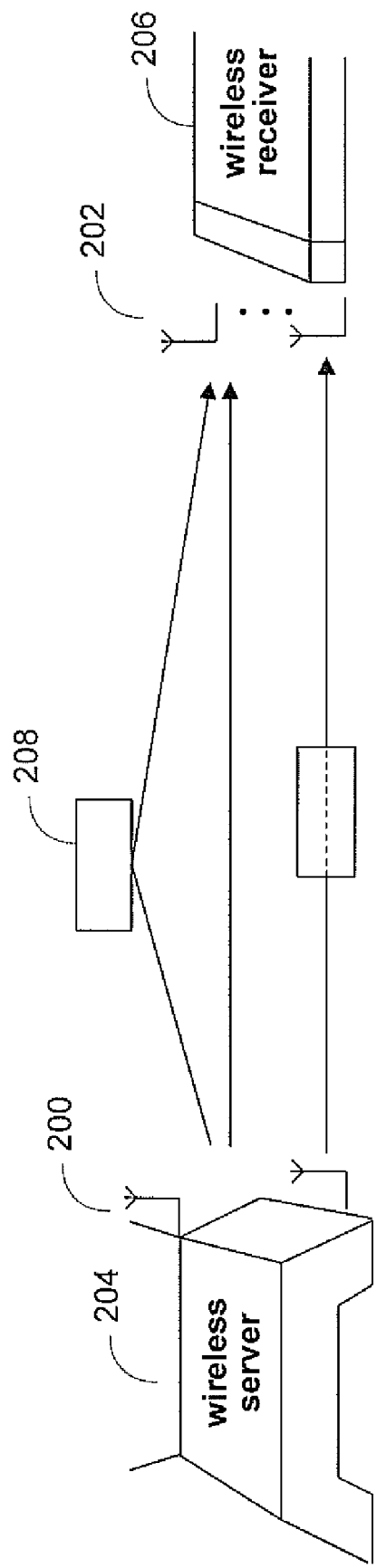
FIG. 2 is a wireless transmission system in accordance with one embodiment of the system in FIG. 1.

In one embodiment, FIG. 1 represents a wireless communication system, pictured in FIG. 2. In this embodiment, transmitter 102 is a wireless server 204, such as a commercial gateway modem, and receiver 112 is a wireless receiver 206, such as a commercial wireless computer adapter. Channel 106 is space 208 between wireless server 204 and wireless receiver 206, which obstructs and attenuates the signal due to at least multipath fades and shadowing effects. Typically, wireless communication systems use spatial dimensions to implement multiple dimensions in the form of multiple transmitting antennas 200 and receiving antennas 202.

Returning to FIG. 1, transmitter 102 prepares bit sequence 100 into signals capable of transmission through channel 106. For an uncoded system, bit sequence 100 is a binary message, where the message carries only information bits. Alternatively, for a coded system, bit sequence 100 may be an encoded version of the message. Thus, bit sequence 100 may have originated from a binary data source or from the output of a source encoder (not pictured).

Figure 3:
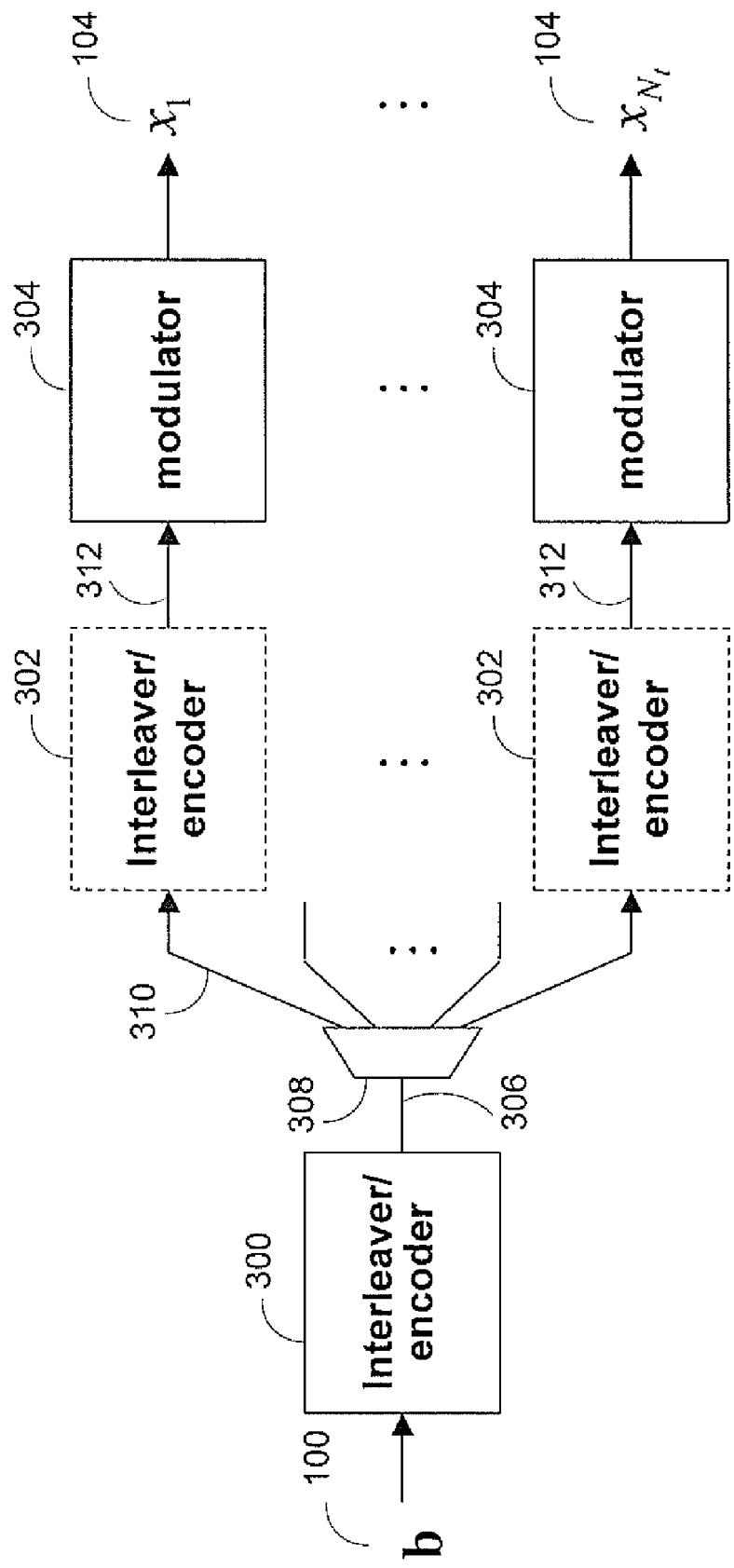
FIG. 3 is a block diagram of a transmitter.

One embodiment of transmitter 102 is shown in FIG. 3. Transmitter 102 converts bit sequence 100 into signals 104 appropriate for transmission through channel 106 (FIG. 1). Bit sequence 100 is passed through interleaver/encoder 300, which may interleave and/or encode bit sequence 100. If interleaver/encoder 300 performs encoding, the encoding may be based on any suitable error control code (e.g., convolutional, block, error-detecting, error-correcting, etc.). If interleaving is performed, each bit in bit sequence 100 may be assumed to be independent of all other bits in bit sequence 100. Bit sequence 306 at the output of interleaver 300 is demultiplexed by demultiplexor 308 across $N_t$ paths 310.

Each demultiplexed output 310 may or may not go through another interleaver and/or coding block 302, yielding bit sequences 312. Finally, bit sequences 312 are modulated with modulators 304, and are transmitted as signals $x_1, \ldots, x_{N_t}$, or x in vector form.

Figure 4A:
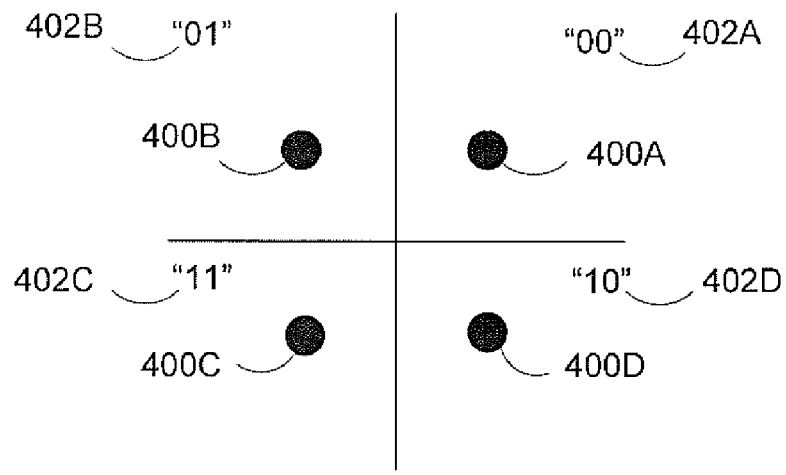
FIG. 4A is a signal constellation set for quadrature amplitude modulation with four signal points.

Modulators 304 group the incoming bits into symbols, which are mapped and converted to signals according to a signal constellation set and carrier signal. In one embodiment of the invention, modulator 304 uses quadrature amplitude modulation (QAM). Each symbol is mapped to a signal point in the QAM signal constellation set, where the signal points are differentiated from one another by phase and/or magnitude. For example, FIG. 4A shows a 4-QAM signal constellation set in a complex number plane. In this case, signal points 400A-400D are distinguishable only by phase. Each signal point represents a different two-bit symbol 402A-402D: 400A represents "00" (402A), 400B represents "01" (402B), 400C represents "11" (402C), and 400D represents "10" (402D). However, any other one-to-one mapping from symbol to signal point is valid.

Figure 4B:
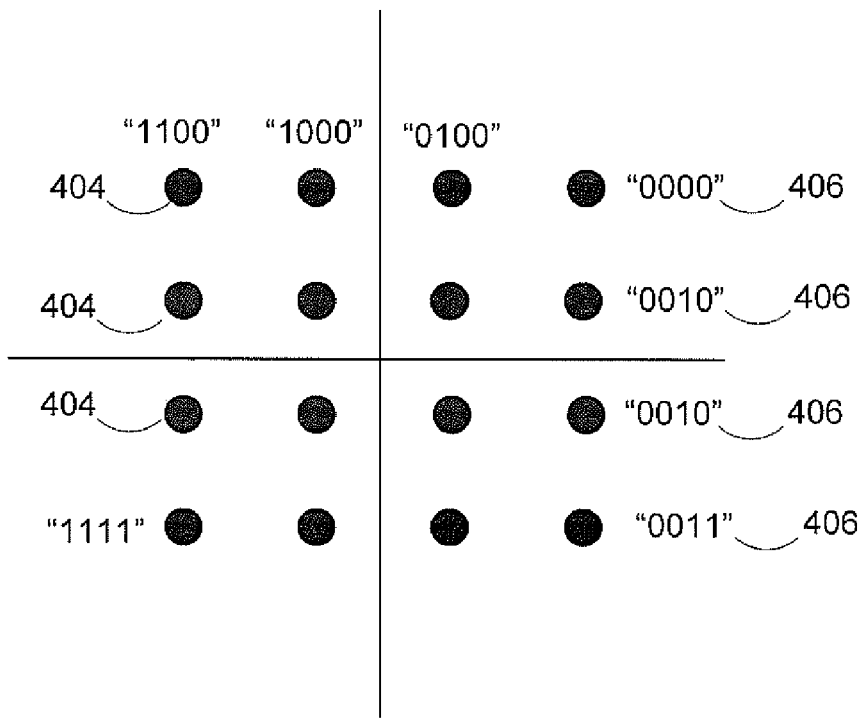
FIG. 4B is a signal constellation set for quadrature amplitude modulation with 16 signal points.

FIG. 4B shows a 16-QAM signal constellation set, where four-bit sequences 406 are combined into one symbol. Here, both the amplitudes and the phase of signal points 404 may vary. FIG. 4B shows a partial mapping from symbols 406 to signal points 404, where the each symbol is shown closest to its corresponding signal point. However, as before, any other mapping is possible. In general, an m-bit symbol may be mapped according to an M-QAM signal set, where $M=2^m$. Therefore, for the transmitter configuration shown in FIG. 3, transmitter 102 is capable of transmitting in $mN_t$ bits concurrently.

In accordance with one embodiment of the present invention, transmitter 102 sends the same vector, x, multiple times according to a protocol that is also known and followed by receiver 112. Depending on the protocol, there may be additional components in transmitter 102 that are not shown in FIG. 3. It should be understood that transmitter 102 may be altered in order to implement such protocols. For example, if an automatic repeat request (ARQ) protocol is used, transmitter 102 may need a buffer to store x, or equivalently bit stream 100, in the event that a retransmission is requested.

Even though x is transmitted, receiver 112 in FIG. 1 actually receives $y_i$, where $$y_i = Hx + n_i, \quad 1 \leq i \leq N \quad (1)$$

For clarity, FIG. 5 shows the components of each vector in equation (1). Index i represents the ith instance that the same transmitted vector, x, is transmitted. $y_i$ is an $N_r \times 1$ vector, where each vector component is the signal received by one of the $N_r$ inputs of receiver 112. $H_i$ 500 is an $N_r \times N_t$ channel matrix that defines how channel 106 alters the transmitted vector, x. $n_i$ is an $N_r \times 1$ vector of additive noise. Note that the characteristics of channel 106, reflected in matrix 500, and noise sources 108, and therefore received signal 110, may be different for each instance i. Differences arise because each transmission of x occurs at a different time or through a different medium.

In one embodiment, noise sources 108 may be modeled as additive white Gaussian noise (AWGN) sources. In this case, noise sources 108 are independent and identically distributed (i.i.d). That is, the noise that affects any of the $N_r$ components in any $n_i$ does not affect the noise for any other component in $n_i$, and the noise at any given time does not affect the noise at any other time. Also, all of the noise sources have the same probabilistic characteristics. Furthermore, each component of $n_i$ has zero mean and is random in terms of both magnitude and phase, where the magnitude and the phase are also independent. This type of noise source is called an i.i.d. zero mean circularly symmetric complex Gaussian (ZMCSCG) noise source. If the variance of each component is $N_0$, then the conditional probability distribution function (pdf) of the received signal, $Pr\{y|x,H\}$, is given by $$Pr\{y \mid x, H\} = \frac{1}{(\pi N_0)^N} \exp\left\{-\frac{\|y - Hx\|^2}{N_0}\right\} \quad (2)$$

Equation (2) will be used with reference to maximum-likelihood decoding discussed in greater detail below in connection with FIG. 10.

Receiver 112 may use one or more of the N received copies of x to determine the information that was transmitted. Receiver 112 may combine multiple received vectors into a single vector for decoding, thereby utilizing more than one, and possibly all, of the transmitted signal vectors. The combining scheme disclosed in the present invention will be discussed in greater detail below in connection with FIGS. 7-11. It should be understood that the receiver in the present invention may combine all received signal vectors. Alternatively, a subset of the received signal vectors and channel matrices may be combined. For example, a received signal and the corresponding channel matrix may be discarded if the magnitude of a component in the received signal vector is below a certain threshold. Thus, the variable N should refer to the number of received signal vectors used by the receiver, which is not necessarily the same as the number of total signal vectors received.

Figure 6A:
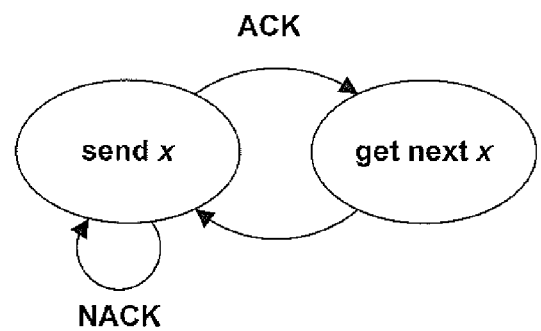
FIG. 6A is a flow diagram of a stop-and-wait HARQ transmitter.
Figure 6B:
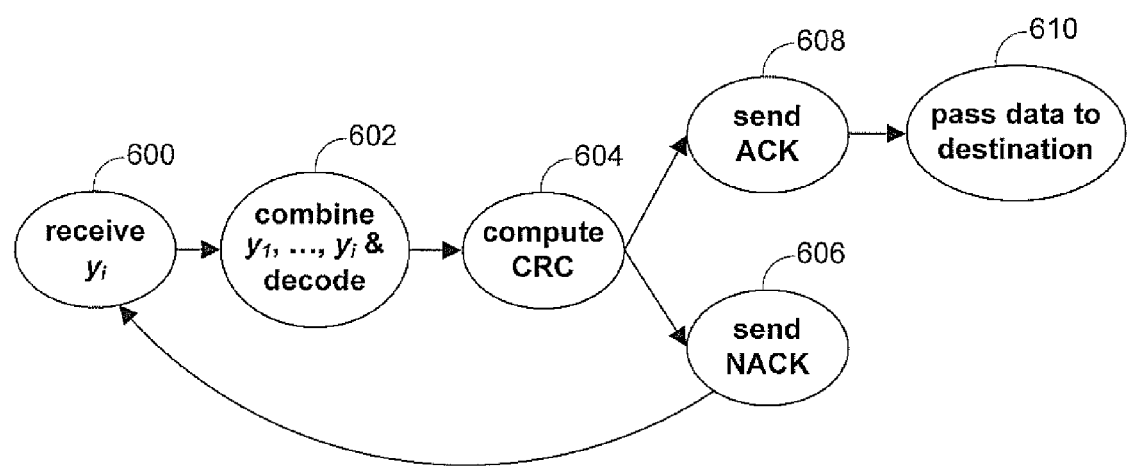
FIG. 6B is a flow diagram of a HARQ receiver.

In one embodiment of the invention, receiver 112 receives multiple instances of a common transmit vector using a retransmission protocol. For example, the transmitter and receiver may use a HARQ type-I protocol. A flow chart of the steps taken by transmitter 102 and receiver 112 are shown in FIG. 6A and FIG. 6B, respectively. FIG. 6A shows a transmitter following a stop-and-wait protocol, where the transmitter waits until a signal vector has been accepted by the receiver before sending the next signal vector. Other protocols, such as go-back-N, selective repeat, or any other suitable protocol may be used in place of stop-and-wait. Therefore, it should be understood that FIG. 6A may be modified in order to implement a different protocol.

FIG. 6B shows a simplified flow chart of a HARQ type-I receiver protocol in accordance with one aspect of the invention. At some time, receiver 112 receives $y_i$ at step 600, corresponding to the ith transmission of x. At step 602, receiver 112 may combine all the signal vectors corresponding to transmitted signal x that have been received thus far, that is $y_1, \ldots, y_i$, into a single vector, $\tilde{y}$, and decodes the combined vector or a processed version of the combined vector. In FIG. 6B, decoding refers to determining the CRC-protected message based on the combined signal vector. Other possible decoding outputs will be discussed in greater detail below in connection with FIG. 7. Errors in individual signal vectors may be corrected by combining the received signal vectors such that the combined signal vector, $\tilde{y}$, is correctable by decoding. Following decoding, error detection is performed at step 604, which in this case involves checking the CRC of the decoded vector. If errors are detected, the receiver may send a negative acknowledgement (NACK) message to the transmitter at step 606. Upon receipt of the NACK, the transmitter may send the same transmitted signal vector, which is received at step 600 as $y_{i+1}$. $y_{i+1}$ may be different from $y_i$ even though the same transmit signal vector x is used at the transmitter, because $y_{i+1}$ is transmitted at a later time than $y_i$ and is affected by different noise and/or channel characteristics. The i+1 vectors are combined and decoded, as described previously. This procedure occurs N times, until by combining and decoding N received vectors, no CRC error is detected. At this point, the receiver sends an acknowledgment (ACK) message at step 608 back to the transmitter to inform the transmitter that the vector has been successfully received. Also, since there are no errors in the decoded data, the receiver passes the decoded data to the destination at step 610.

In another embodiment of the invention, the transmitter sends a signal vector, x, a fixed number of times, irrespective of the presence of errors. For example, the receiver may obtain N transmissions of x from repetition coding. N copies of x may be transmitted simultaneously, or within some interval of time. The receiver combines signal vectors, $y_1, \ldots, y_N$, and may decode the combination or a processed version of the combination. Repetition coding may be useful when there is no feasible backchannel for the receiver to send retransmission requests.

HARQ type-I and repetition coding are two protocols that may be used in different embodiments of the present invention. Alternatively, repetition coding and HARQ can be combined such that multiple vectors are received at step 600 before combining and decoding at step 602. The invention, however, is not limited to the two protocols and their combination mentioned here. Currently, the IEEE 802.16e standard uses HARQ and repetition coding, so these particular protocols merely illustrate embodiments of the invention. Any protocol that allows the receiver to receive multiple copies of the same transmitted vector fall within the scope of the present invention.

Figure 7:
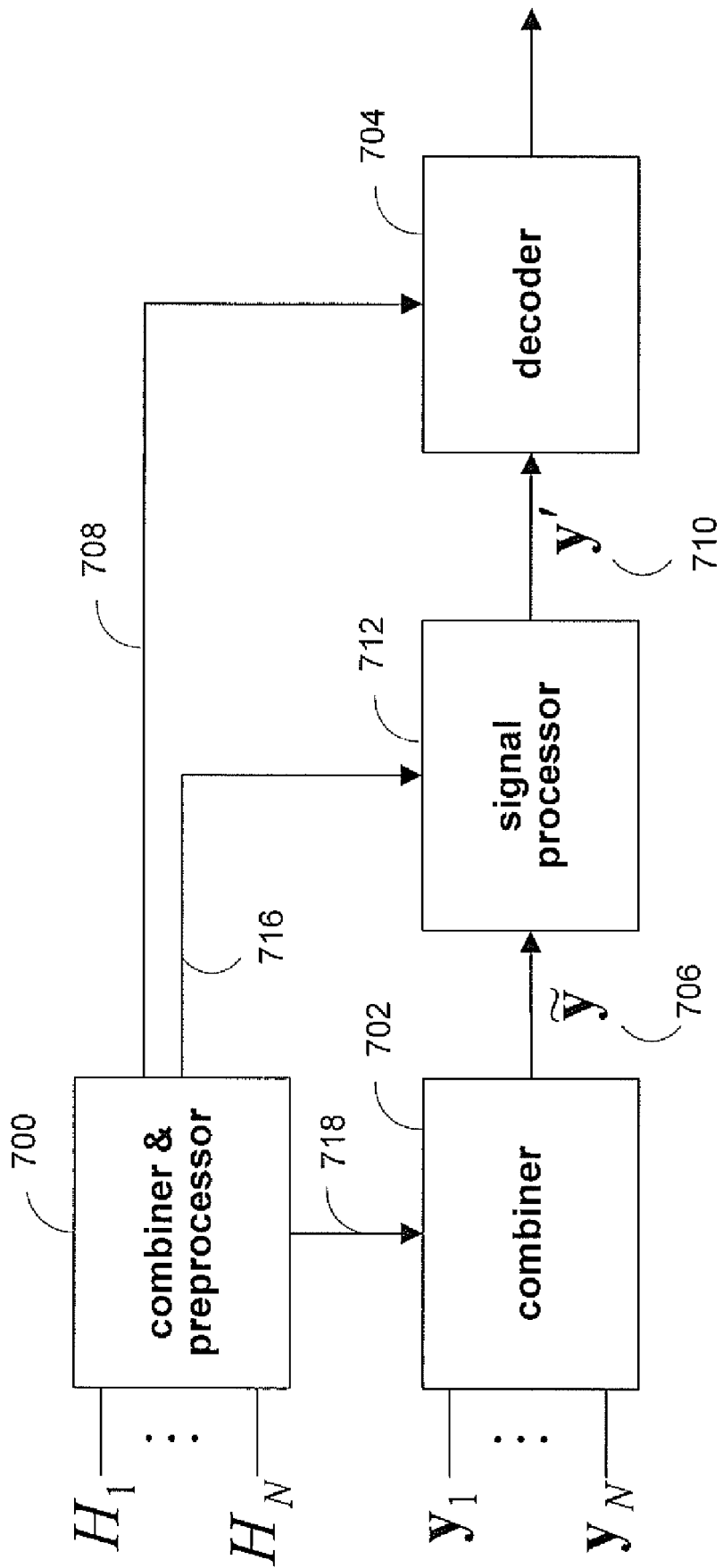
FIG. 7 is a high level block diagram of a receiver.

FIG. 7 is a block diagram of one embodiment of receiver 112 in accordance with one aspect of the present invention. Furthermore, it illustrates one way to implement combining and decoding at step 602 in FIG. 6B. Combiner 702, which may or may not use channel information 718 provided from channel combiner 700, combines the symbols of the N received vectors using any suitable combining technique. This type of combining is hereinafter referred to as symbol-level combining, because the combiner operates on the symbols of the signal vector. Combined received vector 706, $\tilde{y}$, can be passed to signal processor 712. Signal processor 712 may process the combined received vector to produce a new signal vector with white noise components. If the noise is already white, signal processor 712 may be bypassed or omitted from the receiver, or may perform other processing functions on the combined received signal vector. Signal processor 712 may also use channel information 716 provided by channel combiner/preprocessor 700. After the noise of the combined received vector is whitened, the processed signal vector, y', is decoded by decoder 704. Decoder 704 may use channel information 708 provided by combiner 700 to operate on processed signal vector 710, y'. Decoder 704 may return an estimate of the signal vector, x. Decoder 704 may return soft information or hard information. If decoder 704 returns hard information, it may have been the result of hard-decoding or soft-decoding. For a coded system, decoder 704 may return coded information or decoded information.

Figure 8:
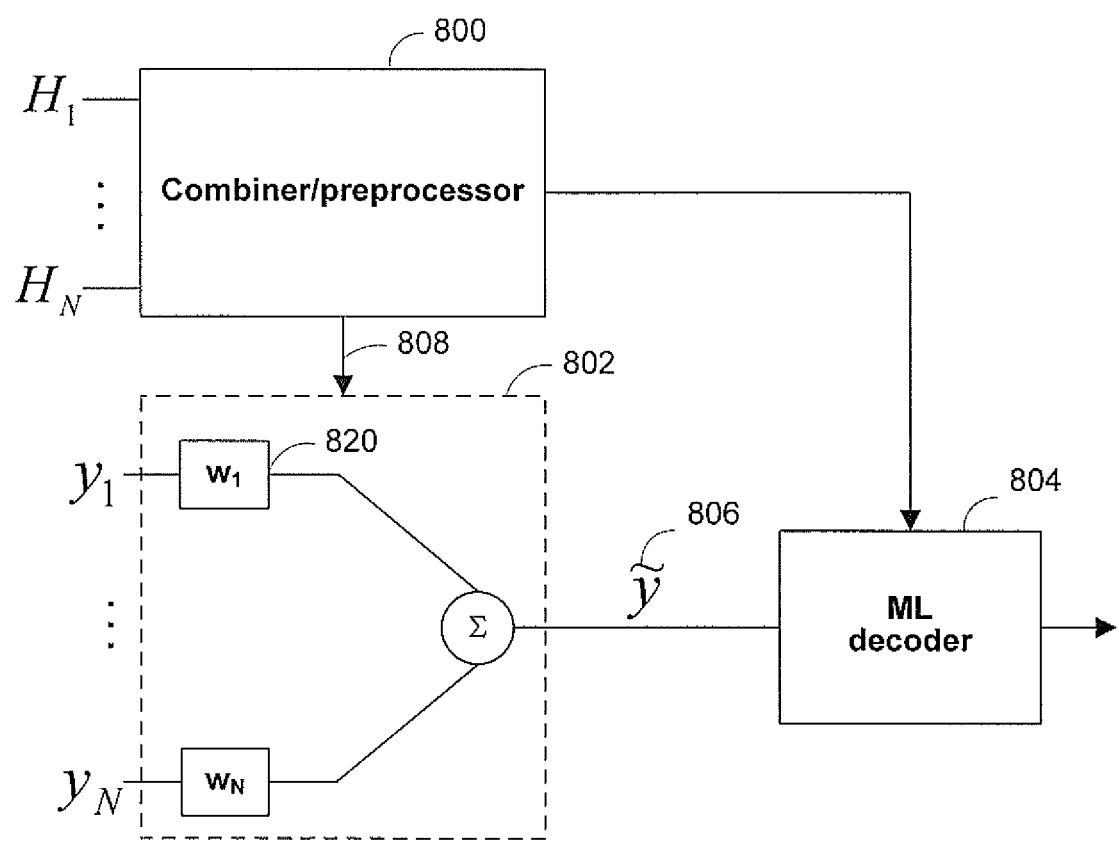
FIG. 8 is a detailed embodiment of FIG. 7 for a single input, single output (SISO) system.

Single-input single-output (SISO) systems are a special case of MIMO systems in which $N_t = N_r = 1$. System 800, in FIG. 8, shows a detailed embodiment of FIG. 7 for a SISO system. First, the signals are combined by weighted addition.

Weights 820 may be chosen to maximize the signal-to-noise (SNR) ratio, a technique called maximal ratio combining (MRC). For MRC or other weighted addition combining, weights 820 may be functions of channel information 808 determined by combiner 800. Following combining by symbol combiner 802, combined received signal 806 may be decoded using maximum-likelihood (ML) decoder 804.

Figure 9:
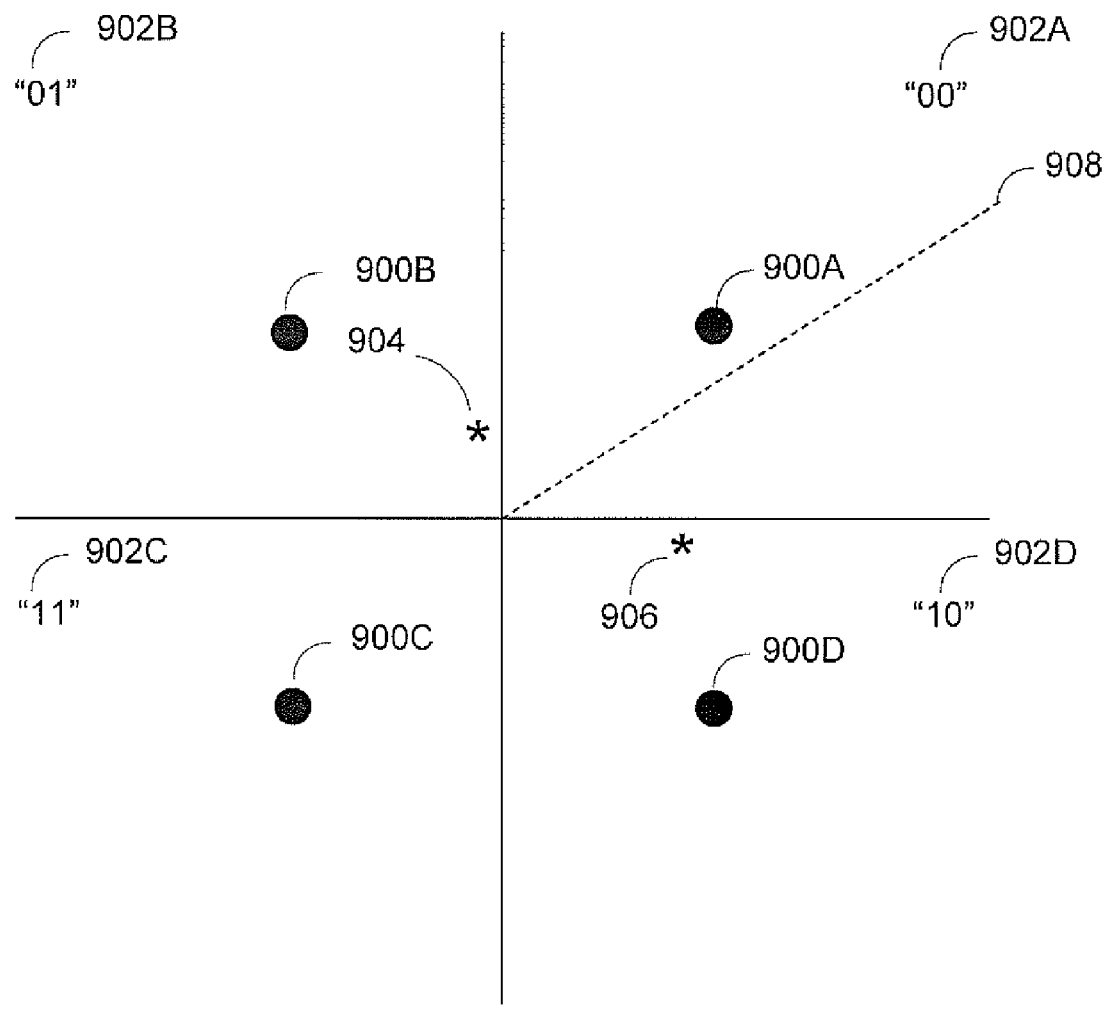
FIG. 9 is a diagram illustrating symbol-level combining in a 4-QAM system using weighted addition.

FIG. 9 shows an example of a weighted addition combining, HARQ receiver of the configuration shown in FIG. 8. The signal constellation set is 4-QAM, which was described above in connection with FIG. 4A. Signal points 900A-900D represent the magnitude and phase of transmitted symbols 902A-902D, respectively. For illustration purposes, assume that the transmitter is sending the symbol, "00" (902A), to the receiver using a HARQ type-I protocol. Assume, again for the purpose of illustration, that the channel does not attenuate, amplify, or alter the signal in any way. Therefore, ideally, a symbol with the magnitude and phase of signal point 900A would be received. However, if due to additive noise, a signal with a magnitude and phase of signal point 904 is actually received, it will be incorrectly decoded as "01," because it is closer to signal point 900B than 900A. Note that an ML decoder may make this decision if the noise is assumed to be AWGN. The error-detecting code may then detect the presence of the bit error, resulting in a request for a retransmission. On the second transmission, a signal corresponding to signal point 906 is received. If signal point 906 is decoded on its own, it may be incorrectly decoded as "10." However, by weighted addition of signal points 904 and 906, the resulting combined symbol may fall approximately on dotted line 908. The combined symbol is now closest to signal point 900A and will be decoded correctly as "00." Thus, the receiver configuration shown in FIG. 8 may be used to effectively decode multiple received signal vectors.

Referring back to FIG. 8, a mathematical treatment of the combining scheme for a SISO system is considered. To maximize SNR, weights 820 may take on the value, $$w_i = \frac{h_i^*}{\sqrt{\sum_{i=1}^{N} |h_i|^2}},$$

for each received symbol, $y_i$. These weights may be computed by combiner/preprocessor 800. Therefore, the combined received symbol may be equal to:

$$\tilde{y} = \sum_{i=1}^{N} \frac{h_i^* y_i}{\sqrt{\sum_{i=1}^{N} |h_i|^2}} \qquad (3)$$

$$= \sqrt{\sum_{i=1}^{N} |h_i|^2} \, x + \tilde{n} \qquad (4)$$

$$= \tilde{h}x + \tilde{n} \qquad (5)$$

where $$\tilde{h} = \sqrt{\sum_{i=1}^{N} |h_i|^2}$$

and $$\tilde{n} = \sum_{i=1}^{N} \frac{h_i^* n_i}{\sqrt{\sum_{i=1}^{N} |h_i|^2}}.$$

Note that noise component $\tilde{n}$ in the combined received symbol is Gaussian, because a weighted sum of Gaussian variables is still Gaussian. Furthermore, the weights for MRC are chosen such that the noise has unit variance. Therefore, a noise whitening filter, such as signal processor 712 in FIG. 7, is not needed. As shown in equation (5), the combined symbol, $\tilde{y}$, may be treated as an individually received signal vector affected by channel $\tilde{h}$ and Gaussian noise $\tilde{n}$.

Therefore, following combining, ML decoder 804 may decode the combined symbol as if it was a single received symbol. ML decoder 804 may calculate a log-likelihood ratio (LLR) for each bit of the common transmit sequence. An LLR is a soft-bit metric often associated with maximum-likelihood decoding. For a received symbol y containing a bit corresponding to transmitted bit $b_k$, where y is received from a channel with response h, the LLR for bit $b_k$ may be defined as $$\ln\left(\frac{Pr\{b_k = 1 \mid y, h\}}{Pr\{b_k = 0 \mid y, h\}}\right).$$

Because $\tilde{y}$ may be treated as a single received symbol, the LLR calculation may be expressed as $$\ln\left(\frac{Pr\{b_k = 1 \mid \tilde{y}, \tilde{h}\}}{Pr\{b_k = 0 \mid \tilde{y}, \tilde{h}\}}\right).$$

Figure 10A:
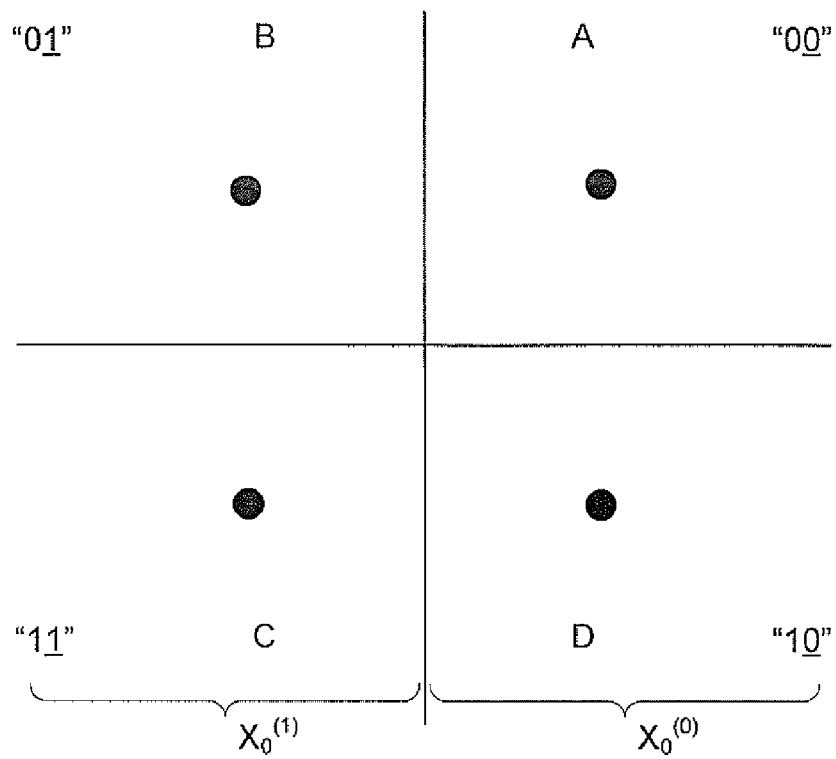
FIGS. 10A-10B show subsets of signal points in a 4-QAM signal constellation set.
Figure 10B:
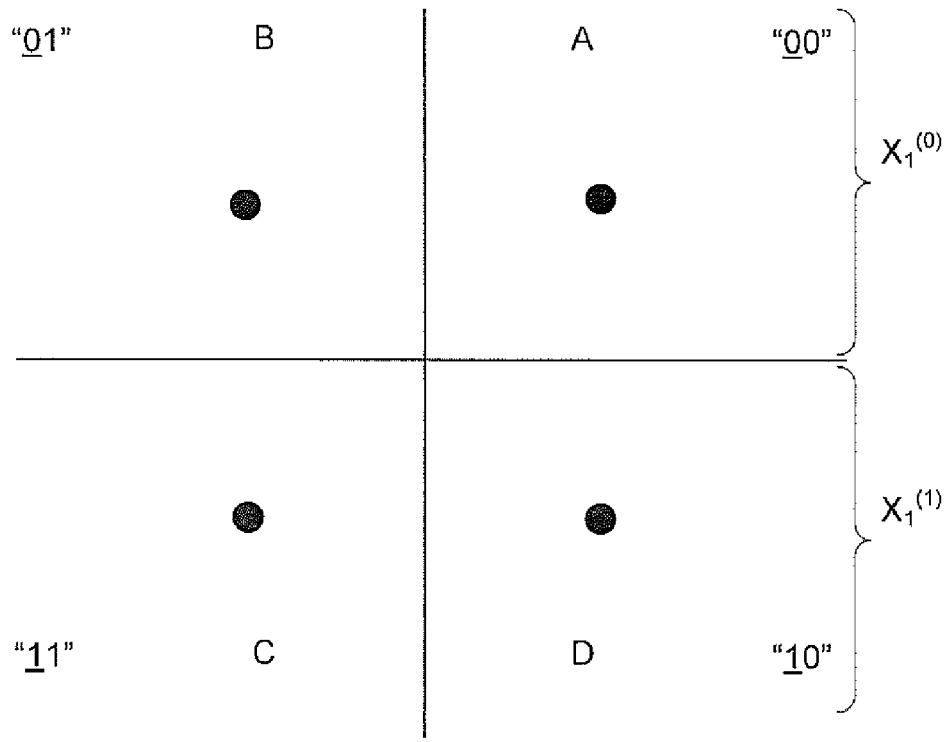

The sign of the LLR indicates the most likely value of the transmitted bit (1 if positive, 0 if negative), and the magnitude of the LLR indicates the strength or confidence of the decision. Thus, ML decoder 804 may output soft information in the form of an LLR for each bit. Alternatively, ML decoder 804 may map the LLR to a hard decision, and output a binary estimate of the transmitted sequence, or may provide the LLR to a soft decoder. To calculate the LLR for a bit, $b_k$, of the common transmitted symbol ML decoder may implement:

$$LLR_{SLC} = \min_{\hat{x}^{(0)} \in X_k^{(0)}} \left|\tilde{y} - \tilde{h}\hat{x}^{(0)}\right|^2 - \min_{\hat{x}^{(1)} \in X_k^{(1)}} \left|\tilde{y} - \tilde{h}\hat{x}^{(1)}\right|^2, \qquad (6)$$

which will be derived below in equations (7) through (12). The variable $X_\lambda^{(j)}$ in equation (6) denotes a subset of the signal constellation set whose $\lambda^{th}$ bit equals j for j=0,1. For example, FIGS. 10A and 10B illustrate the four possible subsets for a 4-QAM signal constellation set. 4-QAM is discussed in greater detail above in connection with FIG. 4A. In each figure, the $\lambda^{th}$ bit is underlined for emphasis. Note that, as is consistent with the definition of the subset, the emphasized bit is the same for all members of a subset. Thus, the signal point in quadrant A belongs in subsets $X_0^{(0)}$ and $X_1^{(0)}$. Similarly, the signal point in quadrant B belongs in subsets $X_0^{(1)}$ and $X_1^{(0)}$, etc.

Equation (6), symbol-level combining LLR equation, may be calculated as follows:

$$LLR_{SLC} = L(b_k \mid \tilde{y}, \tilde{h}) \quad (7)$$

$$= \ln \frac{Pr\{b_k = 1 \mid \tilde{y}, \tilde{h}\}}{Pr\{b_k = 0 \mid \tilde{y}, \tilde{h}\}} \quad (8)$$

$$= \ln \frac{Pr\{\tilde{y} \mid b_k = 1, \tilde{h}\}}{Pr\{\tilde{y} \mid b_k = 0, \tilde{h}\}} \quad (9)$$

$$= \ln \frac{\sum_{\hat{x}^{(1)} \in X_k^{(1)}} Pr\{\tilde{y} \mid \hat{x}^{(1)}, \tilde{h}\}}{\sum_{\hat{x}^{(0)} \in X_k^{(0)}} Pr\{\tilde{y} \mid \hat{x}^{(0)}, \tilde{h}\}} \quad (10)$$

$$\simeq \ln \frac{\max_{\hat{x}^{(1)} \in X_k^{(1)}} Pr\{\tilde{y} \mid \hat{x}^{(1)}, \tilde{h}\}}{\max_{\hat{x}^{(0)} \in X_k^{(0)}} Pr\{\tilde{y} \mid \hat{x}^{(0)}, \tilde{h}\}} \quad (11)$$

$$= \min_{\hat{x}^{(0)} \in X_k^{(0)}} |\tilde{y} - \tilde{h}\hat{x}^{(0)}|^2 - \min_{\hat{x}^{(1)} \in X_k^{(1)}} |\tilde{y} - \tilde{h}\hat{x}^{(1)}|^2, \quad (12)$$

Equations (7) and (8) follow from the definition of the LLR as previously described. Equation (9) is reached by applying Bayes' Theorem, a technique known in the art, to equation (8). Then, equation (10) shows equation (9) written in terms of transmitted symbols, $\hat{x}$, instead of transmitted bits, $b_k$. For example, in the numerator of equation (9), the probability that $b_0 = 1$ is the sum of the probabilities that the transmitted symbol was "01" or "11" for a 4-QAM system. As shown in FIG. 10A, "01" and "11" is subset $X_0^{(1)}$. Therefore, $Pr\{\tilde{y} \mid b_0 = 1, \tilde{h}\}$ is equivalent to $\Sigma_{\hat{x}^{(1)} \in X_0^{(1)}} Pr\{\tilde{y} \mid \hat{x}^{(1)}, \tilde{h}\}$. Finally, equation (11) utilizes the approximation, $\Sigma_i \log a_i \approx \log \max_i a_i$, and equation (12) results from plugging in equation (2) for the condition probabilities. Recall that equation (2) is the conditional probability distribution function (PDF) for an AWGN channel.

The receiver for a SISO system shown in FIG. 8 with MRC is referred to as an optimal receiver scheme for decoding a signal vector. An optimal receiver scheme is hereinafter defined to be one that, given the N received signal vectors, chooses the signal vector that has the highest probability of being the actual transmit signal vector in the presence of AWGN. This is considered optimum, because all information from the N received signals is used fully. Mathematically, an optimum decoding scheme chooses the signal vector, $\hat{x}$, that maximizes $$Pr\{\hat{x} \mid y_1, \ldots, y_N, h_1, \ldots, h_N\}. \quad (13)$$

A decoder that maximizes equation (13) is a maximum-likelihood decoder. Thus, such a decoder may compute an associated LLR for each bit, which is referred to herein as an optimum LLR, or $LLR_{opt}$.

$LLR_{opt}$ may be derived as follows:

$$LLR_{opt} = L(b_k \mid y_1, \ldots, y_N, h_1, \ldots, h_N) \quad (14)$$

$$= \ln \frac{Pr\{b_k = 1 \mid y_1, \ldots, y_N, h_1, \ldots, h_N\}}{Pr\{b_k = 0 \mid y_1, \ldots, y_N, h_1, \ldots, h_N\}} \quad (15)$$

$$= \ln \frac{Pr\{y_1, \ldots, y_N \mid b_k = 1, h_1, \ldots, h_N\}}{Pr\{y_1, \ldots, y_N \mid b_k = 0, h_1, \ldots, h_N\}} \quad (16)$$

-continued $$= \ln \frac{\sum_{\hat{x}^{(1)} \in X_k^{(1)}} Pr\{y_1, \ldots, y_N \mid \hat{x}^{(1)}, h_1, \ldots, h_N\}}{\sum_{\hat{x}^{(0)} \in X_k^{(0)}} Pr\{y_1, \ldots, y_N \mid \hat{x}^{(0)}, h_1, \ldots, h_N\}} \quad (17)$$

$$= \ln \frac{\sum_{\hat{x}^{(1)} \in X_k^{(1)}} \prod_{i=1}^{N} Pr\{y_i \mid \hat{x}^{(1)}, h_i\}}{\sum_{\hat{x}^{(0)} \in X_k^{(0)}} \prod_{i=1}^{N} Pr\{y_i \mid \hat{x}^{(0)}, h_i\}} \quad (18)$$

$$\simeq \ln \frac{\max_{\hat{x}^{(1)} \in X_k^{(1)}} \prod_{i=1}^{N} Pr\{y_i \mid \hat{x}^{(1)}, h_i\}}{\max_{\hat{x}^{(0)} \in X_k^{(0)}} \prod_{i=1}^{N} Pr\{y_i \mid \hat{x}^{(0)}, h_i\}} \quad (19)$$

$$= \min_{\hat{x}^{(0)} \in X_k^{(0)}} \left\{ \sum_{i=1}^{N} |y_i - h_i \hat{x}^{(0)}|^2 \right\} - \min_{\hat{x}^{(1)} \in X_k^{(1)}} \left\{ \sum_{i=1}^{N} |y_i - h_i \hat{x}^{(1)}|^2 \right\} \quad (20)$$

Equation (14) and (15) follow from the definition of the log-likelihood ratio. Most of the remaining equations are derived through substantially the same process as equations (7) through (12). Equation (18) follows from the statistical independence between each received signal vector. Thus, for independent received symbols $y_1$ and $y_2$, $Pr(y_1, y_2) = Pr(y_1) Pr(y_2)$, as shown in equation (18).

Although the LLR determined by the symbol-level combining receiver (equation (12)) does not appear to be equal to the optimal LLR (equation (20)), the difference arises due to the $\Sigma_i \log a_i \approx \log \max_i a_i$ approximation. Before the $\Sigma_i \log a_i \approx \log \max_i a_i$ approximation, it may be shown that the MRC-based symbol-level-combining scheme of FIG. 8 produces an optimal receiver. Recall that Equation (10) is the equation for calculating an LLR in the MRC-based symbol-level combining scheme of FIG. 8 prior to applying the approximation. Equation (10) is reproduced below as equation (21). Thus, the following sequence of equations shows that the LLR produced by symbol-level combining is equivalent to the optimal LLR.

$$LLR_{SLC} = \ln \frac{\sum_{\hat{x}^{(1)} \in X_k^{(1)}} Pr\{\tilde{y} \mid \hat{x}^{(1)}, \hat{h}\}}{\sum_{\hat{x}^{(0)} \in X_k^{(0)}} Pr\{\tilde{y} \mid \hat{x}^{(0)}, \hat{h}\}} \quad (21)$$

$$= \ln \frac{\sum_{\hat{x}^{(1)} \in X_k^{(1)}} \frac{1}{\pi} \exp\{-|\tilde{y} - \tilde{h}\hat{x}^{(1)}|^2\}}{\sum_{\hat{x}^{(0)} \in X_k^{(0)}} \frac{1}{\pi} \exp\{-|\tilde{y} - \tilde{h}\hat{x}^{(0)}|^2\}} \quad (22)$$

$$= \ln \frac{\sum_{\hat{x}^{(1)} \in X_k^{(1)}} \exp\{-|\tilde{y}|^2 + 2\Re\{\tilde{y}^* \tilde{h}\hat{x}^{(1)}\} - |\hat{x}^{(1)}|^2\}}{\sum_{\hat{x}^{(0)} \in X_k^{(0)}} \exp\{-|\tilde{y}|^2 + 2\Re\{\tilde{y}^* \tilde{h}\hat{x}^{(0)}\} - |\hat{x}^{(0)}|^2\}} \quad (23)$$

-continued $$= \ln \frac{\sum_{\hat{x}^{(1)} \in X_k^{(1)}} \exp\left\{2\Re\left\{\left(\sum_{i=1}^N y_i^* h_i\right)\hat{x}^{(1)}\right\} - \left(\sum_{i=1}^N |h_i|^2\right)|\hat{x}^{(1)}|^2\right\}}{\sum_{\hat{x}^{(0)} \in X_k^{(0)}} \exp\left\{2\Re\left\{\left(\sum_{i=1}^N y_i^* h_i\right)\hat{x}^{(0)}\right\} - \left(\sum_{i=1}^N |h_i|^2\right)|\hat{x}^{(0)}|^2\right\}} \quad (24)$$

$$= \ln \frac{\sum_{\hat{x}^{(1)} \in X_k^{(1)}} \exp\left\{-\left(\sum_{i=1}^N |y_i|^2\right) + 2\Re\left\{\left(\sum_{i=1}^N y_i^* h_i\right)\hat{x}^{(1)}\right\} - \left(\sum_{i=1}^N |h_i|^2\right)|\hat{x}^{(1)}|^2\right\}}{\sum_{\hat{x}^{(0)} \in X_k^{(0)}} \exp\left\{-\left(\sum_{i=1}^N |y_i|^2\right) + 2\Re\left\{\left(\sum_{i=1}^N y_i^* h_i\right)\hat{x}^{(0)}\right\} - \left(\sum_{i=1}^N |h_i|^2\right)|\hat{x}^{(0)}|^2\right\}} \quad (25)$$

$$= \ln \frac{\sum_{\hat{x}^{(1)} \in X_k^{(1)}} \exp\left\{-\sum_{i=1}^N |y_i - h_i \hat{x}^{(1)}|^2\right\}}{\sum_{\hat{x}^{(0)} \in X_k^{(0)}} \exp\left\{-\sum_{i=1}^N |y_i - h_i \hat{x}^{(0)}|^2\right\}} \quad (26)$$

$$= \ln \frac{\sum_{\hat{x}^{(1)} \in X_k^{(1)}} \prod_{i=1}^N \frac{1}{\pi} \exp\{-|y_i - h_i \hat{x}^{(1)}|^2\}}{\sum_{\hat{x}^{(0)} \in X_k^{(0)}} \prod_{i=1}^N \exp\{-|y_i - h_i \hat{x}^{(0)}|^2\}} \quad (27)$$

$$= \ln \frac{\sum_{\hat{x}^{(1)} \in X_k^{(1)}} \prod_{i=1}^N Pr\{y_i \mid \hat{x}^{(1)}, h_i\}}{\sum_{\hat{x}^{(0)} \in X_k^{(0)}} \prod_{i=1}^N Pr\{y_i \mid \hat{x}^{(0)}, h_i\}} \quad (28)$$

$$= LLR_{opt} \quad (29)$$

Equation (22) follows from equation (21) by plugging in the PDF for an AWGN channel shown in equation (2). The remaining equations follow from mathematical manipulation. Equation (28) is the same as equation (18), which was shown above to be equal to the optimal LLR. Therefore, the decoding scheme used by the receiver in FIG. 8 is an optimal decoding scheme for signals received from an AWGN channel. Even if the receiver implements equation (6), which utilizes the $\Sigma_i \log a_i \approx \log \max_i a_i$ approximation, the decoding results of the receiver may still be near-optimal.

Figure 11:
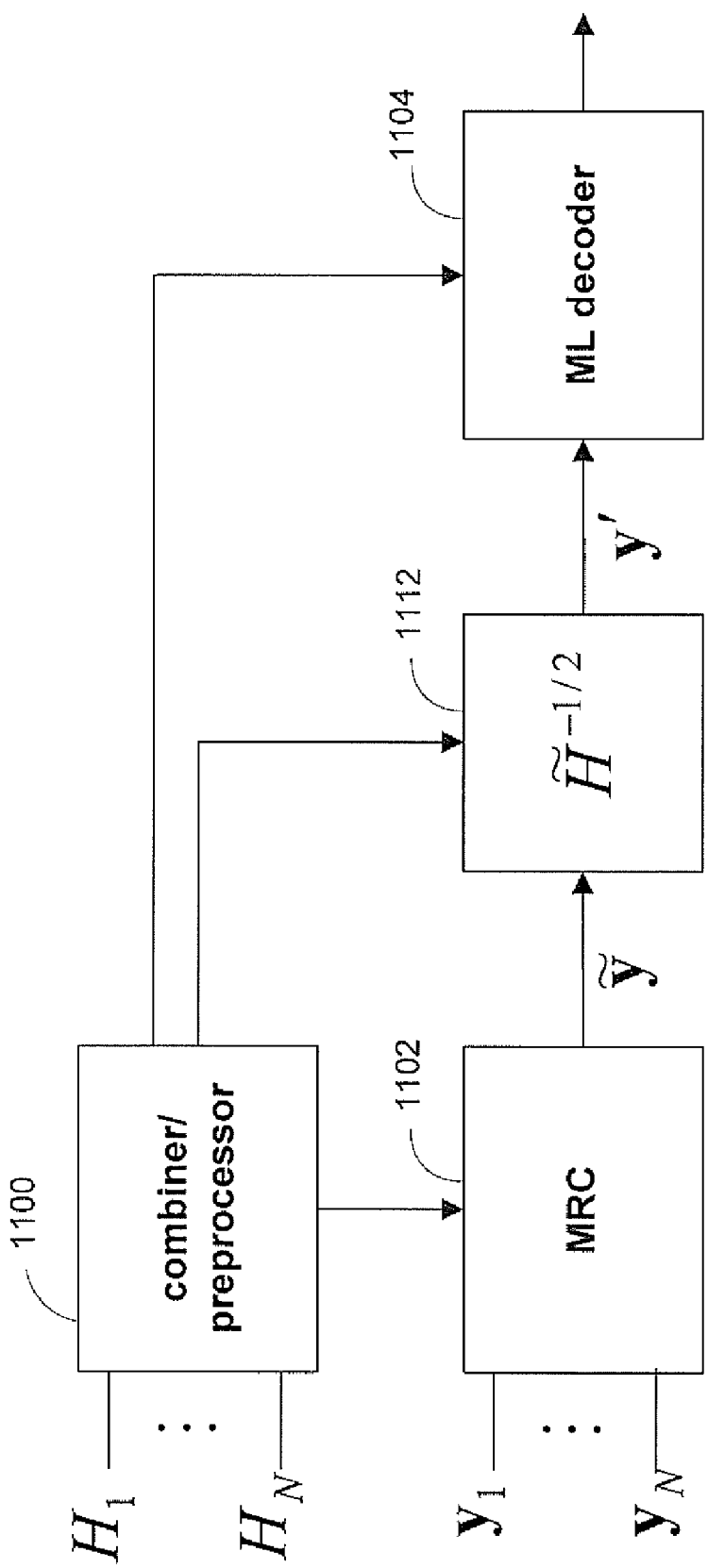
FIGS. 11-12 show detailed embodiments of FIG. 7 for a MIMO system.

FIG. 11 shows an illustrative block diagram for a symbol-level combining receiver in a MIMO system. Also, FIG. 11 is a detailed view of one embodiment of the receiver configuration shown in FIG. 7. Combiner 1102 may combine the N received signal vectors by weighted addition. In one embodiment of the present invention, the resulting combined received signal vector may be:

$$\tilde{y} = H_1^* y_1 + H_2^* y_2 + \ldots H_N^* y_N \quad (30)$$

$$= (H_1^* H_1 + H_2^* H_2 + \ldots H_N^* H_N) x + \tilde{n} \quad (31)$$

$$= \tilde{H} x + \tilde{n} \quad (32)$$

where $$\tilde{H} = \sum_{i=1}^N H_i^* H_i \text{ and } \tilde{n} = \sum_{i=1}^N H_i^* n_i.$$

$\tilde{H}$ is an $N_t \times N_t$ matrix referred to hereinafter as the combined channel matrix, and may be calculated by combiner/preprocessor 1100. $\tilde{n}$ is an $N_t \times 1$ noise vector hereinafter referred to as the combined noise vector. Here, the weights in equations (30) and (31) are chosen to maximize the SNR. Although the term, maximal ratio combining (MRC), is typically used for SISO systems, it will also be used herein to refer to a symbol-level, MIMO combining scheme that maximizes the SNR. Therefore, the embodiment described here can be referred to as an MRC MIMO receiver. Following the combination, equation (32) shows that the combined received signal vector may be modeled as a single received vector, $\tilde{y}$, affected by channel $\tilde{H}$ and noise components $\tilde{n}$. Thus, the combined received signal vector may be decoded in a similar manner as any other received signal vector.

However, the covariance of the combined noise vector, $\tilde{n}$, may easily be shown to equal $\tilde{H}$. Therefore, the noise is not white, because it is well known that white noise has a diagonal covariance matrix. Thus, to whiten the noise components, the combined received signal is processed by signal processor 1112. Signal processor 1112 may whiten the noise by multiplying the signal by $\tilde{H}^{-1/2}$, where a matrix $A^{1/2}$ is defined to be any matrix where $A^{1/2} A^{1/2} = A$. The value of $\tilde{H}^{-1/2}$ may be obtained from combiner/preprocessor 1100. Following the multiplication, the processed signal, y', may be equal to:

$$y_N' = \tilde{H}_N^{-\frac{1}{2}} \tilde{y}_N \quad (33)$$

$$= \tilde{H}_N^{\frac{1}{2}} x + n_N' \quad (34)$$

where the covariance of the processed noise vector, n', is $E[n'_N n'^*_N] = I_{N_t}$, as desired. Therefore, the processed combined signal vector, y', may be modeled as a single received signal vector affected by an AWGN channel, where the channel response matrix is $\tilde{H}^{1/2}$ and the noise vector is n'.

The filtered signal, y', may then be decoded by ML decoder 1104. The ML decoder may calculate the log-likelihood ratio by implementing the equation, $$LLR_{SLC} = \min_{\hat{x}^{(0)} \in X_k^{(0)}} \left\| y' - \tilde{H}^{\frac{1}{2}} \hat{x}^{(0)} \right\|^2 - \min_{\hat{x}^{(1)} \in X_k^{(1)}} \left\| y' - \tilde{H}^{\frac{1}{2}} \hat{x}^{(1)} \right\|^2, \quad (35)$$

Equation (35) may be derived as follows:

$$LLR_{SLC} = L(b_k \mid y', \tilde{H}^{1/2}) \quad (36)$$

-continued $$= \ln \frac{Pr\{b_k = 1 | y', \tilde{H}^{1/2}\}}{Pr\{b_k = 0 | y', \tilde{H}^{1/2}\}} \quad (37)$$

$$= \ln \frac{\sum_{\hat{x}^{(1)} \in X_k^{(1)}} Pr\{y' | \hat{x}^{(1)}, \tilde{H}^{1/2}\}}{\sum_{\hat{x}^{(0)} \in X_k^{(0)}} Pr\{y' | \hat{x}^{(0)}, \tilde{H}^{1/2}\}} \quad (38)$$

$$\simeq \ln \frac{\max_{\hat{x}^{(1)} \in X_k^{(1)}} Pr\{y' | \hat{x}^{(1)}, \tilde{H}^{1/2}\}}{\max_{\hat{x}^{(0)} \in X_k^{(0)}} Pr\{y' | \hat{x}^{(0)}, \tilde{H}^{1/2}\}} \quad (39)$$

$$= \min_{\hat{x}^{(0)} \in X_k^{(0)}} \|y' - \tilde{H}^{1/2}\hat{x}^{(0)}\|^2 - \min_{\hat{x}^{(1)} \in X_k^{(1)}} \|y' - \tilde{H}^{1/2}\hat{x}^{(1)}\|^2, \quad (40)$$

Equations (36) and (37) follow from the definition of the LLR. The remaining equations may be derived through substantially the same process as the process used to obtain equations (7) through (12). ML decoder 1104 may output the LLRs directly as soft information or may convert the LLRs to another soft-bit metric. Alternatively, ML decoder 1104 may map the LLRs to hard decisions, and output a binary sequence estimate of the transmitted sequence, or may output the LLRs to a soft decoder.

It may be shown that the MRC-based symbol-level combining scheme shown in FIG. 11 is an optimal decoding scheme. An optimal LLR for a MIMO system may be calculated as follows:

$$LLR_{opt} = L(b_k | y_1, \ldots, y_N, H_1, \ldots, H_N) \quad (41)$$

$$= \ln \frac{Pr\{b_k = 1 | y_1, \ldots, y_N, H_1, \ldots, H_N\}}{Pr\{b_k = 0 | y_1, \ldots, y_N, H_1, \ldots, H_N\}} \quad (42)$$

$$= \ln \frac{\sum_{\hat{x}^{(1)} \in X_k^{(1)}} Pr\{y_1, \ldots, y_N | \hat{x}^{(1)}, H_1, \ldots, H_N\}}{\sum_{\hat{x}^{(0)} \in X_k^{(0)}} Pr\{y_1, \ldots, y_N | \hat{x}^{(0)}, H_1, \ldots, H_N\}} \quad (43)$$

$$= \ln \frac{\sum_{\hat{x}^{(1)} \in X_k^{(1)}} \prod_{i=1}^{N} Pr\{y_i | \hat{x}^{(1)}, H_i\}}{\sum_{\hat{x}^{(0)} \in X_k^{(0)}} \prod_{i=1}^{N} Pr\{y_i | \hat{x}^{(0)}, H_i\}} \quad (44)$$

$$\simeq \ln \frac{\max_{\hat{x}^{(1)} \in X_k^{(1)}} \prod_{i=1}^{N} Pr\{y_i | \hat{x}^{(1)}, H_i\}}{\max_{\hat{x}^{(0)} \in X_k^{(0)}} \prod_{i=1}^{N} Pr\{y_i | \hat{x}^{(0)}, H_i\}} \quad (45)$$

$$= \min_{\hat{x}^{(0)} \in X_k^{(0)}} \left\{\sum_{i=1}^{N} \|y_i - H_i\hat{x}^{(0)}\|^2\right\} - \min_{\hat{x}^{(1)} \in X_k^{(1)}} \left\{\sum_{i=1}^{N} \|y_i - H_i\hat{x}^{(1)}\|^2\right\} \quad (46)$$

Equation (41) and (42) follow from the definition of the log-likelihood ratio. The remaining equations are derived through substantially the same process as equations (7) through (12) or equations (14) through (20).

Although the LLR determined by the symbol-level combining receiver (equation (40)) does not appear to be equal to the optimal LLR (equation (46)), the difference arises due to the $\Sigma_i \log a_i \approx \log \max_i a_i$ approximation. Before the approximation, it may be shown that the MRC-based symbol-level-combining scheme produces an optimal receiver. The following sequence of equations shows that the LLR produced by symbol-level combining is equivalent to the optimal LLR.

$$LLR_{SLC} = \ln \frac{\sum_{\hat{x}^{(1)} \in X_\lambda^{(1)}} \frac{1}{\pi N_r} \exp\{-\|y' - \tilde{H}^{1/2}\hat{x}^{(1)}\|^2\}}{\sum_{\hat{x}^{(0)} \in X_\lambda^{(0)}} \frac{1}{\pi N_r} \exp\{-\|y' - \tilde{H}^{1/2}\hat{x}^{(0)}\|^2\}} \quad (47)$$

$$= \ln \frac{\sum_{\hat{x}^{(1)} \in X_\lambda^{(1)}} \exp\{-(\tilde{y}^* - \hat{x}^{(1)*}\tilde{H}^*)\tilde{H}^{-1}(\tilde{y} - \tilde{H}\hat{x}^{(1)})\}}{\sum_{\hat{x}^{(0)} \in X_\lambda^{(0)}} \exp\{-(\tilde{y}^* - \hat{x}^{(0)*}\tilde{H}^*)\tilde{H}^{-1}(\tilde{y} - \tilde{H}\hat{x}^{(0)})\}} \quad (48)$$

$$= \ln \frac{\sum_{\hat{x}^{(1)} \in X_\lambda^{(1)}} \exp\left\{-\left(\begin{array}{c}\tilde{y}^*\tilde{H}^{-1}\tilde{y} - \tilde{y}^*\hat{x}^{(1)} - \\ \hat{x}^{(1)*}\tilde{y} + \hat{x}^{(1)*}\tilde{H}\hat{x}^{(1)}\end{array}\right)\right\}}{\sum_{\hat{x}^{(0)} \in X_\lambda^{(0)}} \exp\left\{-\left(\begin{array}{c}\tilde{y}^*\tilde{H}^{-1}\tilde{y} - \tilde{y}^*\hat{x}^{(0)} - \\ \hat{x}^{(0)*}\tilde{y} + \hat{x}^{(0)*}\tilde{H}\hat{x}^{(0)}\end{array}\right)\right\}} \quad (49)$$

$$= \ln \frac{\sum_{\hat{x}^{(1)} \in X_\lambda^{(1)}} \exp\left\{-\left(\sum_{i=1}^{N} y_i^* y_i - \sum_{i=1}^{N} y_i^* H_i \hat{x}^{(1)} - \sum_{i=1}^{N} \hat{x}^{(1)*} H_i^* y_i + \sum_{i=1}^{N} \hat{x}^{(1)*} H_i^* H_i \hat{x}^{(1)}\right)\right\}}{\sum_{\hat{x}^{(0)} \in X_\lambda^{(0)}} \exp\left\{-\left(\sum_{i=1}^{N} y_i^* y_i - \sum_{i=1}^{N} y_i^* H_i \hat{x}^{(0)} - \sum_{i=1}^{N} \hat{x}^{(0)*} H_i^* y_i + \sum_{i=1}^{N} \hat{x}^{(0)*} H_i^* H_i \hat{x}^{(0)}\right)\right\}} \quad (50)$$

$$= \ln \frac{\sum_{\hat{x}^{(1)} \in X_\lambda^{(1)}} \exp\left\{-\sum_{i=1}^{N} \|y_i - H_i \hat{x}^{(1)}\|^2\right\}}{\sum_{\hat{x}^{(0)} \in X_\lambda^{(0)}} \exp\left\{-\sum_{i=1}^{N} \|y_i - H_i \hat{x}^{(0)}\|^2\right\}} \quad (51)$$

$$= LLR_{opt} \quad (52)$$

Equation (47) follows from equation (38), the LLR equation for an MRC-based symbol-level combining receiver, by plugging in the PDF for an AWGN channel shown in equation (2). The remaining equations follow from mathematical manipulation. Equation (51) is equivalent to equation (43) for an AWGN channel, which was shown above to be equal to the optimal LLR. Therefore, the decoding scheme used by the receiver in FIG. 11 may be used to implement an optimal decoding scheme for signal vectors received from an AWGN channel. Even if the receiver implements equation (40), which utilizes the $\Sigma_i \log a_i \approx \log \max_i a_i$ approximation, the decoding results of the receiver may still be near-optimal.

Note that the expression, $\|y' - \tilde{H}^{1/2} x\|^2$, is essentially a distance calculation, and is a significant portion of the equation for calculating an LLR, shown above as equation (35), for a MIMO system. Therefore, the $\|y' - \tilde{H}^{1/2} x\|^2$ distance equation, or any other such equation in an LLR equation, is hereinafter referred to as a decoding metric. The decoding metric for ML decoder 1104 may be calculated as follows:

$$\|y'_N - \tilde{H}_N^{\frac{1}{2}} x_N\|^2 = (y'_N - \tilde{H}_N^{\frac{1}{2}} x_N)^* (y'_N - \tilde{H}_N^{\frac{1}{2}} x_N) \tag{53}$$

$$= (\tilde{y}_N^* \tilde{H}_N^{-\frac{1}{2}*} - x_N^* \tilde{H}_N^{\frac{1}{2}*})(\tilde{H}_N^{-\frac{1}{2}} \tilde{y}_N - \tilde{H}_N^{\frac{1}{2}} x_N) \tag{54}$$

$$= x_N^* \tilde{H}_N x_N - 2\mathrm{R}\{x_N^* \tilde{y}_N\} + \tilde{y}_N^* \tilde{H}_N^{-1} \tilde{y}_N \tag{55}$$

Notice that the last term in equation (55) does not depend on the transmitted signal vector. Therefore, the last term is common to both the numerator and denominator in deriving the LLR (derived above in equations (36) through (39)), and may be ignored in the LLR calculation, or equivalently, the circuit implementation of the calculation.

The receivers illustrated in FIGS. 7, 8, and 11 show all N received vectors and N channel response matrices as inputs into their respective combining blocks. However, all N signal vectors and N channel matrices are not necessarily given to the combiners at the same time, and the receiver is not required to wait until after all N signal vectors are received to begin operating. Instead, the receivers shown in FIGS. 7, 8, and 11 merely illustrate that the system is capable of combining information from all N transmissions of a common transmit signal vector in any suitable manner. In fact, in some embodiments, such as when a HARQ protocol is used, the combiners may only need to accept one signal vector or channel matrix at any given time, and information on the previous transmissions may be obtained from some other source.

Figure 12:
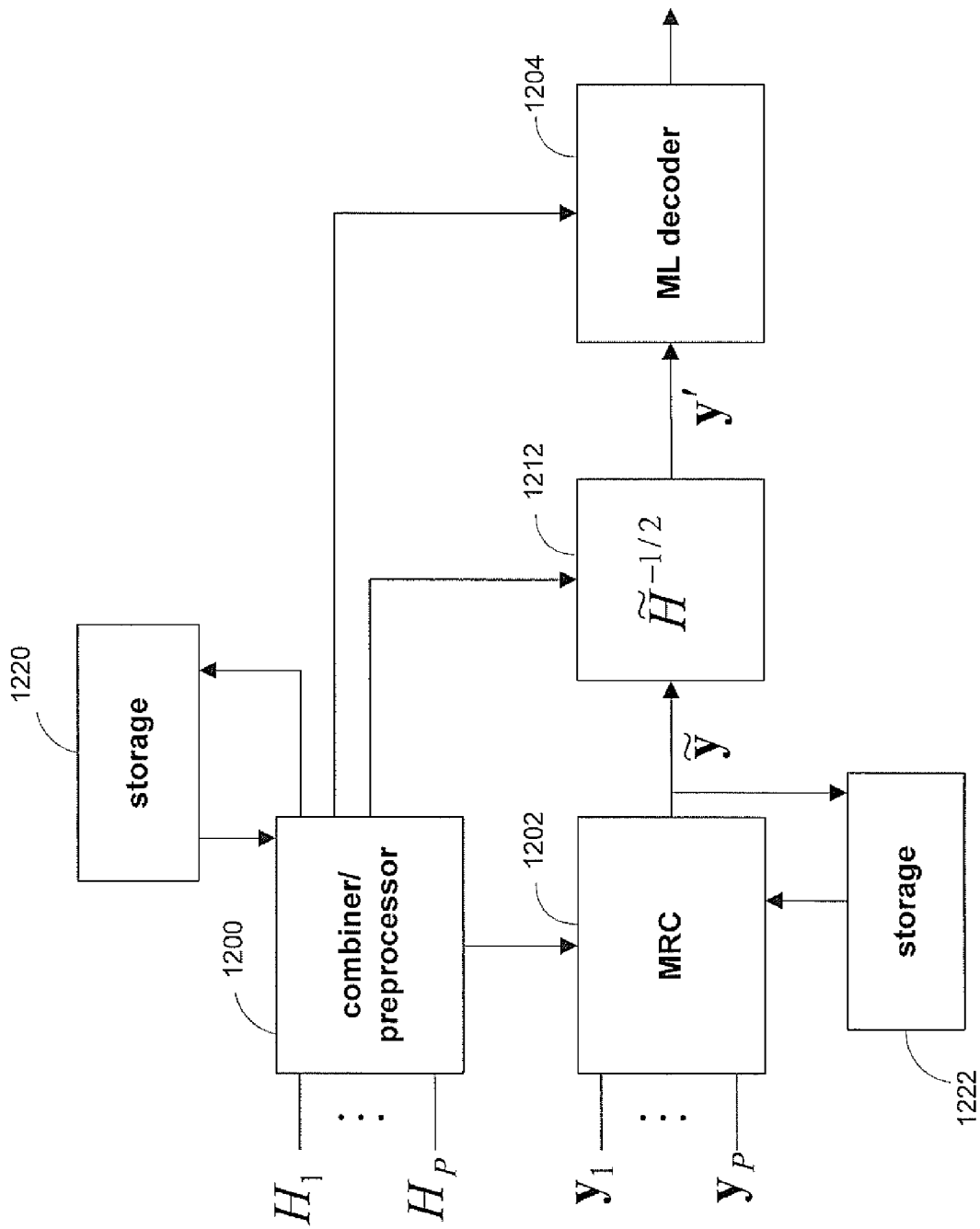

FIG. 12 shows a more detailed view of one embodiment of the receiver of FIG. 11 that illustrates how a receiver may operate when N signal vectors are received in groups of P signal vectors, where P≦N. Combiner/preprocessor 1200, combiner 1202, ML decoder 1204, and signal processor 1212 may be substantially the same as and/or have substantially the same functionality as combiner/preprocessor 1100, combiner 1102, ML decoder 1104, and signal processor 1112 of FIG. 11, respectively. The variable P is hereinafter defined to be the number of signal vectors that are received substantially at the same time (e.g., concurrently, within a given amount of time, etc.). Thus, for a HARQ or ARQ protocol, P may be equal to one. For repetition coding or another suitable fixed transmission scheme, P may be equal to N. For other suitable protocols, 1<P<N. For simplicity, it is assumed that P is divisible by N. In this scenario, there are a total of P/N transmissions of P signal vectors. The present invention, however, is not limited to this constrained situation. Also, for clarity, subscripts on any combined vectors or matrices will refer to the number of vectors or matrices included in the combination. For example, $\tilde{y}_i$ may refer to a combined received signal vector for a combination of received vectors $y_1, \ldots, y_i$ or $y_{i+1} \ldots, y_{2i}$, etc.

When a first set of P signal vectors is received by the system in FIG. 12, no previous information about the common transmit signal vector is available. Therefore, combiners 1200 and 1202 may calculate the combined received vector, $\tilde{y}_P$, and the combined channel matrix, $\tilde{H}_P$, for the P signal vectors, respectively. The values of $\tilde{y}_P$ and $\tilde{H}_P$ may be stored in storage 1222 and 1220, respectively, for future use. Although storage 1220 and 1222 are shown to be separate in FIG. 12, they may also be a single storage system. Combiner/preprocessor 1200 may additionally calculate $\tilde{H}_P^{1/2}$ using $\tilde{H}_P$. Therefore, ML decoder 1204 may optimally decode for the common transmit signal based on the information available in the P received signal vectors.

When a second set of P signal vectors is received, combiners 1200 and 1202 may combine the newly received signal vectors with the information for the first set of signal vectors stored in storage 1220 and 1222. That is, combiner 1202 may calculate $\tilde{y}_P$ for the second set of P signal vectors, and may add them to the combined vector that has already been calculated. Similarly, combiner 1200 may calculate $\tilde{H}_P$ for the second set of P channel matrices, if they are different than the first set, and may add them to the combined channel matrix that has already been calculated. If the channel matrices are the same as for the first transmission, combiner 1200 may simply utilize the information obtained from the previous calculations. Thus, combiners 1200 and 1202 may obtain combined signal vectors and combined channel matrices for the first 2P signal vectors ($\tilde{y}_{2P}$ and $\tilde{H}_{2P}$) without re-computing information obtained from previous transmissions. Mathematically, combiners 1200 and 1202 may compute:

$$\tilde{y}_{2P} = \sum_{i=1}^{2P} H_i^* y_i = \tilde{y}_P + \sum_{j=P+1}^{2P} H_j^* y_j \tag{56}$$

$$\tilde{H}_{2P} = \sum_{i=1}^{2P} H_i^* H_i = \tilde{H}_P + \sum_{j=P+1}^{2P} H_j^* H_j. \tag{57}$$

$\tilde{y}_{2P}$ and $\tilde{H}_{2P}$ may be stored in storage 1222 and 1220, respectively, by overwriting $\tilde{y}_P$ and $\tilde{H}_P$ that was stored after the first transmission. $\tilde{y}_{2P}$ and $\tilde{H}_{2P}$ may then be utilized when a third set of P signal vectors are received.

Using the storage systems shown in FIG. 12, a receiver may incrementally change its combined received vector and combined channel matrix as new sets of signal vectors are received. After each set of P signal vectors is received, ML decoder 1204 produces an optimal estimate of the common transmit signal vector for the given number of signal vectors that have been received. Thus, the effectiveness of the receiver does not depend on the number of received vectors. This is particularly useful for certain transmission protocols, such as HARQ, where the number of received signal vectors may vary.

Another benefit illustrated by the receiver configuration in FIG. 12, and may be true of any of the other embodiments of the present invention (e.g., FIGS. 7, 11, 13, and 14), is decoder reusability for arbitrary N. That is, only one decoder is implemented no matter how many signal vectors are received. Using a separate decoder for each possible value of N would drastically increase both the amount and complexity of the hardware. In addition, since it would be impractical and impossible to implement a different decoder for all N≧1, the decoding flexibility of the receiver would be limited. Therefore, it may be highly beneficial, in terms of decoder complexity and flexibility, that the receiver configurations shown in FIGS. 7, 11, 12, 13, and 14 may implement a single decoder for arbitrary N.

Another benefit of the receiver configuration in FIG. 12 is memory efficiency. After each set of P signal vectors is received, a new combined signal vector, $\tilde{y}$, is calculated. This signal vector may replace the previous information stored in memory. Therefore, the memory requirement of storage 1220 and 1222 does not depend on the number of received vectors. In particular, storage 1200 may be just large enough to store one copy of $\tilde{H}$, and storage 1202 may be just large enough to store one copy of $\tilde{y}$. This is in contrast to a system that re-computes $\tilde{y}$ and $\tilde{H}$ each time a new set of vectors is received. In this scenario, the receiver would need to save the signal vectors and channel response matrices for all previous transmissions.

Figure 13:
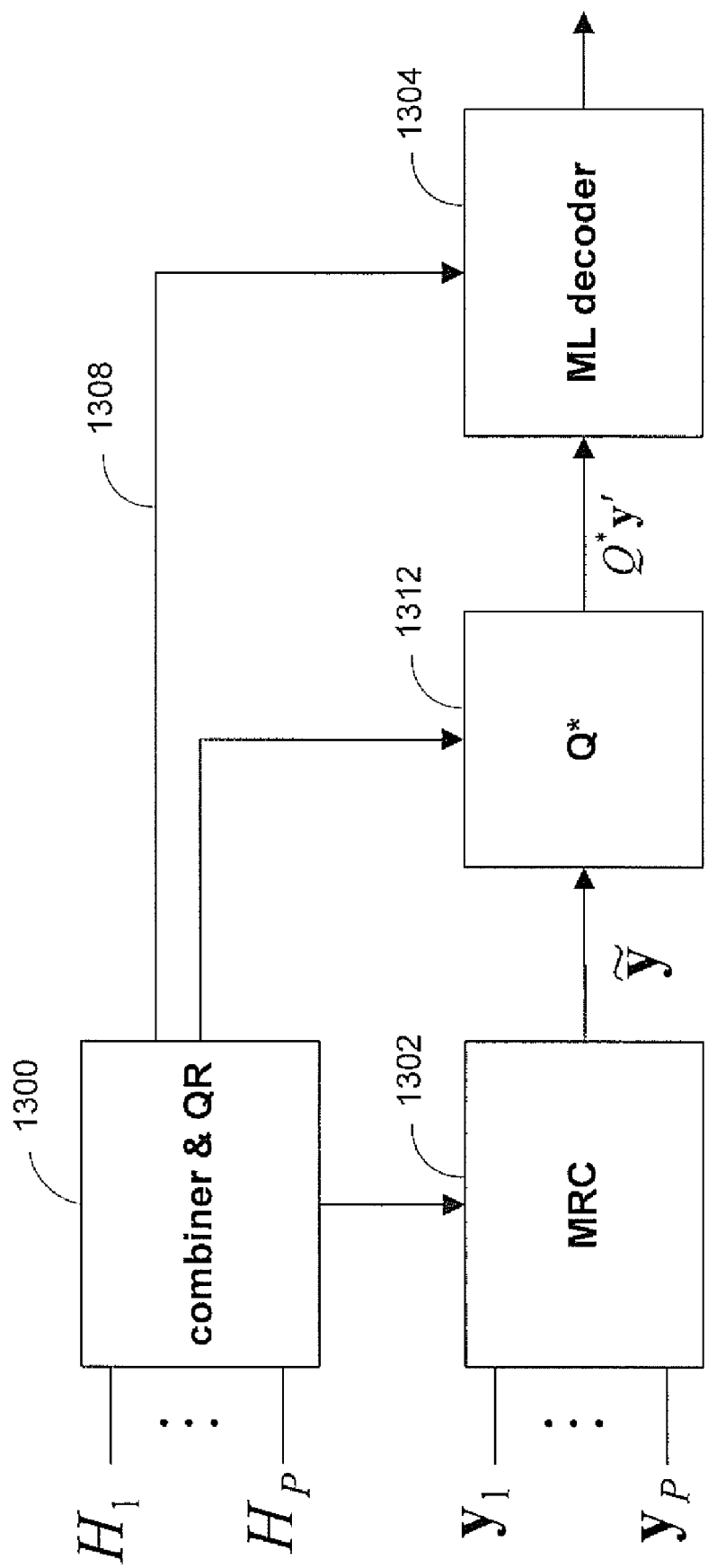
FIG. 13 shows a detailed embodiment of FIG. 7 for a MIMO system that utilizes QR decomposition.
Figure 14:
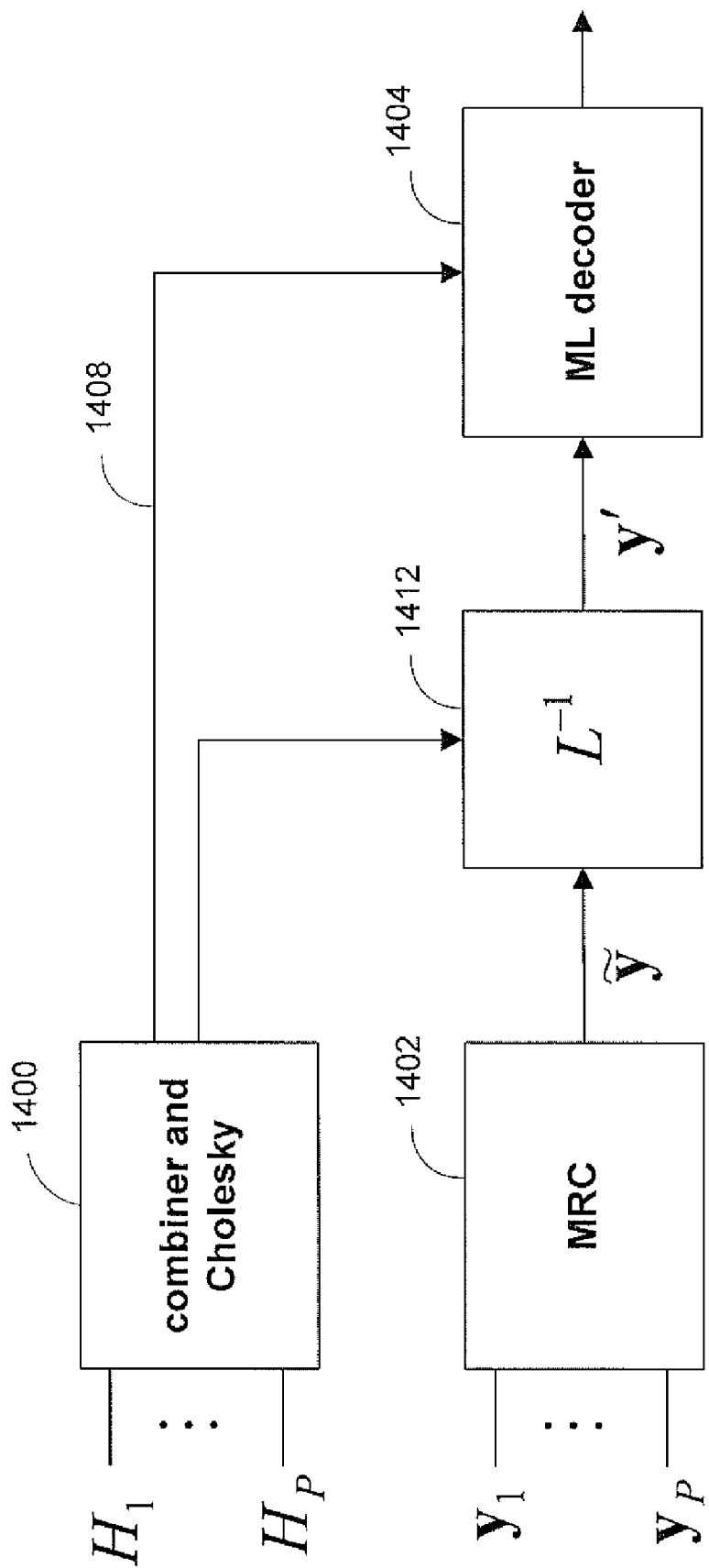
FIG. 14 shows a detailed embodiment of FIG. 7 for a MIMO system that utilizes Cholesky factorization.

Referring now to FIGS. 13 and 14, other detailed embodiments of FIG. 7 for a symbol-level combining receiver are shown. These embodiments utilize additional signal processing techniques that may be used to reduce the calculation complexity of the ML decoder. Storage systems, such as storage 1220 and 1222, are not expressly shown in FIGS. 13 and 14, but may be assumed to be part of their corresponding combiners.

FIG. 13 shows a symbol-level combining receiver that utilizes QR decomposition to reduce the complexity of calculating the ML decoding metric. In addition to combining channel response matrices and determining $\tilde{H}^{1/2}$, combiner/preprocessor 1300 may also factor $\tilde{H}^{1/2}$ into a matrix with orthonormal columns, Q, and a square, upper-triangular matrix R. Therefore, $\tilde{H}^{1/2}=QR$ and $\tilde{H}^{-1/2}=R^{-1}Q^*$. Accordingly, the processed combined received signal vector, $$y'_N = \tilde{H}_N^{-1/2}\tilde{y}_N, \quad (32)$$

computed by signal processor 1312 may be expressed as, $$y'_N = \tilde{H}_N^{1/2}x + n'_N \quad (59)$$

$$= QRx + n'_N, \quad (60)$$

where the covariance of the noise is $E[n'_N n'^*_N]=I_{N_t}$. Signal processor 1312 may additionally process $y'_N$ by multiplying it by $Q^*$. This operation yields, $$Q^*y'_N = Q^*R^{-1}Q^*\tilde{y}_N \quad (61)$$

$$= Rx + Q^*n'_N \quad (62)$$

Therefore, because $Q^*$ is orthonormal and deterministic, the covariance of $Q^*n'_N$ is still the identity matrix. Thus, $Q^*y'_N$ may be treated as a single received signal vector affected by channel R and white noise $Q^*n'_N$.

After signal processor 1312 in FIG. 13 processes y', itself computed by signal processor 1312 from the combined received signal vector provided by combiner 1302, decoder 1304 may decode the result using channel information 1308 provided by channel preprocessor 1300. The decoding metric for the processed signal may be $\|Q^*y'_N - Rx\|^2$, or $\|Q^*R^{-1}Q^*\tilde{y}_N - Rx\|^2$. Because R is an upper-triangular matrix, the complexity of the decoding metric may be reduced compared to the complexity of the decoding metric implemented by ML decoder 1204 in FIG. 12.

Referring now to FIG. 14, the illustrated receiver utilizes Cholesky factorization to reduce the complexity of calculating the ML decoding metric. After combiner 1400 generates a combined channel matrix, $\tilde{H}$, the combiner may factor the combined matrix using a Cholesky factorization. The Cholesky factorization factors a square matrix into a lower triangular matrix, L, and its conjugate transpose, $L^*$. Thus, the combined channel matrix may be written as:

$$\tilde{H}_N = LL^* \quad (63)$$

Therefore, combined received signal vector, $$\tilde{y}_N = \tilde{H}_N x + \tilde{n}_N, \quad (64)$$

from combiner 1402 may be expressed as, $$\tilde{y}_N = LL^*x + \tilde{n}_N. \quad (65)$$

However, the covariance of the combined noise vector, ñ, is equal to $\tilde{H}$. Therefore, the noise is not white, and thus not as easily decodable. To whiten the noise, the combined received vector, ỹ, may be passed through signal processor 1412. Signal processor 1412 may multiply ỹ by the inverse of L, or $L^{-1}$, obtained from preprocessor 1400. This produces a processed signal vector, $$y'_N = L^{-1}\tilde{y}_N = L^{-1}LL^*x + L^{-1}\tilde{n}_N \quad (66)$$

$$= L^*x + \tilde{n}'_N, \quad (67)$$

where $\tilde{n}'_N = L^{-1}\tilde{n}_N$. The new noise component, $n'_N$, is white, because $E[\tilde{n}'_N \tilde{n}'^*_N]=I_{N_t}$. Therefore, $y'_N$ may be treated as a single received signal affected by channel $L^*$ and white noise $n'_N$, and decoded as such.

Therefore, after signal processor 1412 in FIG. 14 produces y', decoder 1404 may decode y' using channel information 1408 provided by channel preprocessor 1400. The decoding metric for the processed signal may be $\|L^{-1}\tilde{y}_N - L^*x\|^2$. Because $L^*$ is an upper-triangular matrix, the complexity of the decoding metric may be reduced compared to the complexity of the decoding metric implemented by ML decoder 1204 in FIG. 12.

Figure 15:
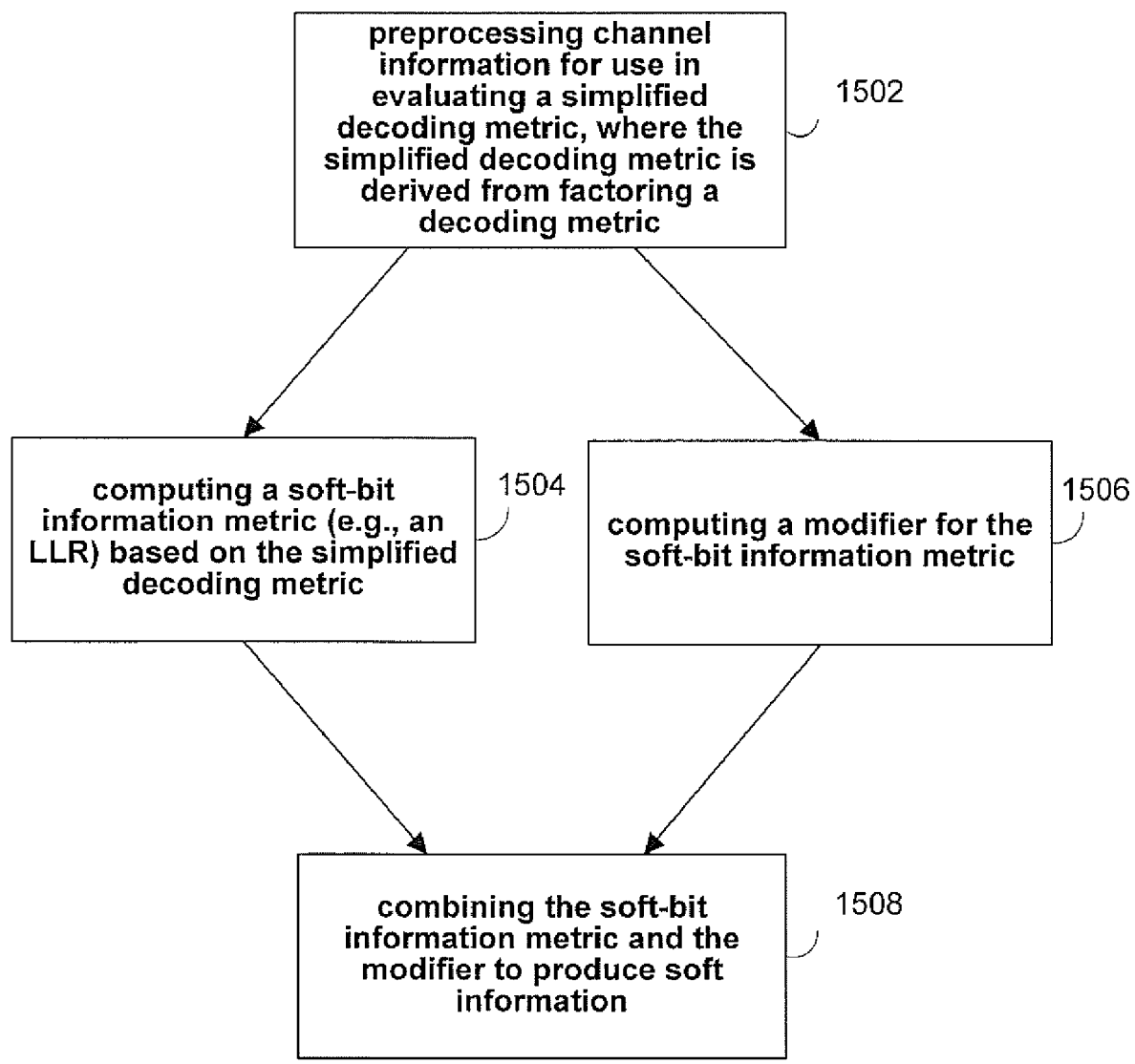
FIG. 15 shows an illustrative flow diagram for decoding a signal vector from a decoding metric.

More detailed embodiments of preprocessor 1400, signal processor 1412, and decoder 1404 (FIG. 14) will be described below in connection with FIGS. 15-17, and equations (68) through (120). In particular, FIGS. 15 and 16 and equations (76) through (98) describe how various components in FIG. 14 may be implemented for a 2-input, 2-output MIMO system. FIGS. 15 and 17 and equations (99) through (120) describe how various components in FIG. 14 may be implemented for a 3-input, 3-output MIMO system. Although only 2-input, 2-output and 3-input, 3-output examples are given, it should be understood that the receiver of FIG. 14 may be practiced according to the description below for any R-input, R-output MIMO system.

Preprocessor 1400 may compute the Cholesky factorization of the combined channel matrix, $\tilde{H}=LL^*$, using the Cholesky algorithm. The Cholesky algorithm is an R-step recursive algorithm, where R is the number of inputs or outputs in the MIMO system. Thus, the number of calculations performed by the preprocessor increases as the size of the channel matrix grows. At each step, the Cholesky algorithm calculates a matrix $A^{(i)}$, where $$A^{(i)} = L_i A^{(i+1)} L^*_i, i=1, \ldots, R \quad (68)$$

The recursive algorithm starts with $A^{(1)}$, which is the original matrix, $\tilde{H}$, and ends with $A^{(R)} = L_R A^{(R+1)} L^*_R$, where $A^{(R+1)}$ is the identity matrix, $I_{R \times R}$. Therefore, by plugging in all R equations for $A^{(i)}$, the algorithm yields, $$\tilde{H} = A^{(R)} = L_1(L_2 \ldots (L_R A^{(R+1)} L^*_R) \ldots L^*_2)L^*_1 \quad (69)$$

$$= L_1(L_2 \ldots (L_R I_{R \times R} L^*_R) \ldots L^*_2)L^*_1 \quad (70)$$

$$= (L_1 L_2 \ldots L_R)(L^*_R \ldots L^*_2 L^*_1) \quad (71)$$

$$= LL^*. \quad (72)$$

The result, as expected, is a decomposition of $\tilde{H}$ that produces a lower triangular matrix, $L = L_1 L_2 \ldots L_R$, and its conjugate transpose, $L^* = L^*_R \ldots L^*_2 L^*_1$. At each stage i, the matrix $A^{(i)}$ may be written as, $$A^{(i)} = \begin{bmatrix} I_{i-1} & 0 & 0 \\ 0 & a^{(i)} & b^{(i)*} \\ 0 & b^{(i)} & B^{(i)} \end{bmatrix}. \tag{73}$$

$a^{(i)}$ is a single entry in $A^{(i)}$, $b^{(i)}$ is an $(R-i) \times 1$ vector, $b^{(i)*}$ is the conjugate transpose of $b^{(i)}$, and $B^{(i)}$ is an $(R-i) \times (R-i)$ matrix. Using equation (68) and the variables defined in equation (73), the matrices $A^{(i+1)}$, for the next step of the algorithm, and $L_i$ may be written as, $$A^{(i+1)} = \begin{bmatrix} I_{i-1} & 0 & 0 \\ 0 & 1 & 0 \\ 0 & 0 & B^{(i)} - \frac{1}{a^{(i)}} b^{(i)} b^{(i)*} \end{bmatrix} \text{ and} \tag{74}$$

$$L_i = \begin{bmatrix} I_{i-1} & 0 & 0 \\ 0 & \sqrt{a^{(i)}} & 0 \\ 0 & \frac{1}{\sqrt{a^{(i)}}} b^{(i)} & I_{N-i} \end{bmatrix} \tag{75}$$

Therefore, preprocessor 1400 may successively calculate matrices $L_1, \ldots, L_R$, and compute $L = L_1 \ldots L_R$ and its inverse, $L^{-1} = L_R^{-1} L_{R-1}^{-1} \ldots L_1^{-1}$.

For a 2×2 combined channel matrix, $$\tilde{H} = \sum_{i=1}^{N} H_i^* H_i,$$

the matrix components may be represented by $h_{11}$, $h_{12}$, $h^*_{12}$, and $h_{22}$. Thus, the first matrix, $A^{(1)}$, may be given by, $$A^{(1)} = \tilde{H} = \begin{bmatrix} h_{11} & h_{12} \\ h^*_{12} & h_{22} \end{bmatrix}. \tag{76}$$

Note that $h_{21}$, the first component on the second line is equal to $h^*_{12}$, because $$\tilde{H} = \sum_{i=1}^{N} H_i^* H_i = \left( \sum_{i=1}^{N} H_i^* H_i \right)^* = \sum_{i=1}^{N} H_i H_i^* = \tilde{H}^*.$$

Using the variables of equation (73), $A^{(1)}$ may also be expressed as, $$A^{(1)} = \begin{bmatrix} h_{11} & h_{12} \\ h^*_{12} & h_{22} \end{bmatrix} \equiv \begin{bmatrix} a^{(1)} & b^{(1)*} \\ b^{(1)} & B^{(1)} \end{bmatrix}. \tag{77}$$

The first step in the recursive algorithm involves determining $A^{(2)}$ and $L_1$ using equations (74) and (75), respectively. Accordingly, $A^{(2)}$ and $L_1$ may be given by, $$A^{(2)} = \begin{bmatrix} 1 & 0 \\ 0 & B^{(1)} - \frac{1}{a^{(1)}} b^{(1)} b^{(1)*} \end{bmatrix} = \begin{bmatrix} 1 & 0 \\ 0 & \frac{1}{h_{11}} h_{11}^{(2)} \end{bmatrix} \text{ and} \tag{78}$$

$$L_1 = \begin{bmatrix} \sqrt{a^{(1)}} & 0 \\ \frac{b^{(1)}}{\sqrt{a^{(1)}}} & I_1 \end{bmatrix} = \begin{bmatrix} \sqrt{h_{11}} & 0 \\ \frac{h^*_{12}}{\sqrt{h_{11}}} & 1 \end{bmatrix}, \tag{79}$$

where $h_{11}^{(2)} = h_{11} h_{22} - h^*_{12} h_{12}$.

After determining $A^{(2)}$, the second and final step in the Cholesky algorithm involves calculating $L_2$ and $A^{(3)}$. In accordance with equation (73), $A^{(2)}$ may be written as, $$A^{(2)} = \begin{bmatrix} 1 & 0 \\ 0 & \frac{1}{h_{11}} h_{11}^{(2)} \end{bmatrix} \equiv \begin{bmatrix} I_1 & 0 \\ 0 & a^{(2)} \end{bmatrix}. \tag{80}$$

Thus, $L_2$ and $A^{(3)}$ may be expressed as, $$A^{(3)} = [I_2] = \begin{bmatrix} 1 & 0 \\ 0 & 1 \end{bmatrix} \text{ and} \tag{81}$$

$$L_2 = \begin{bmatrix} I_1 & 0 \\ 0 & \sqrt{a^{(2)}} \end{bmatrix} = \begin{bmatrix} 1 & 0 \\ 0 & \frac{\sqrt{h_{11}^{(2)}}}{\sqrt{h_{11}}} \end{bmatrix}. \tag{82}$$

As expected at the final step of the Cholesky algorithm, the matrix, $A^{(3)} = A^{(R+1)}$, is the identity matrix. Note that there are only two steps in the Cholesky algorithm, because $\tilde{H}$ is 2×2.

The lower triangular matrix, L, where $\tilde{H} = LL^*$, may be determined following the recursive algorithm described above. In general, L is determined by multiplying $L_1, \ldots, L_P$. Thus, for the 2×2 case, L may be calculated by multiplying $L_1$ and $L_2$, producing, $$L = L_1 L_2 = \begin{bmatrix} \sqrt{h_{11}} & 0 \\ \frac{h^*_{12}}{\sqrt{h_{11}}} & 1 \end{bmatrix} \begin{bmatrix} 1 & 0 \\ 0 & \frac{\sqrt{h_{11}^{(2)}}}{\sqrt{h_{11}}} \end{bmatrix} = \begin{bmatrix} \sqrt{h_{11}} & 0 \\ \frac{h^*_{12}}{\sqrt{h_{11}}} & \frac{\sqrt{h_{11}^{(2)}}}{\sqrt{h_{11}}} \end{bmatrix}. \tag{83}$$

The inverse of L, or $L^{-1}$, may also be calculated by computing the inverse of both $L_1$ and $L_2$, and multiplying them in reverse order. That is, $$L^{-1} = L_2^{-1} L_1^{-1} = \begin{bmatrix} \frac{1}{\sqrt{h_{11}}} & 0 \\ \frac{-h^*_{12}}{\sqrt{h_{11}} \sqrt{h_{11}^{(2)}}} & \frac{\sqrt{h_{11}}}{\sqrt{h_{11}^{(2)}}} \end{bmatrix}. \tag{84}$$

Therefore, using the Cholesky algorithm, a preprocessor (e.g., preprocessor 1400) in a MIMO receiver may compute L and $L^{-1}$ for a combined channel matrix, $\tilde{H}$. These matrices may be used by a signal processor, such as signal processor 1412, or by a decoder, such as ML decoder 1404. Alternatively, a preprocessor may have the equations for one or more factorizations, or equivalent representations of the equations, hard-coded or hard-wired. For example, the preprocessor may hard-code or hard-wire equations (83) and (84).

L and $L^{-1}$, as calculated in the Cholesky algorithm described above, may be used by an ML decoder to compute a log-likelihood ratio for each bit in a transmitted sequence. For example, the receiver in FIG. 14 may be configured such that the ML decoder computes LLRs according to, $$LLR = -\min_{b=0}\{\|L^{-1}Y - L^*X\|^2\} + \min_{b=1}\{\|L^{-1}Y - L^*X\|^2\} \quad (85)$$

Thus, the decoding metric for this receiver may be $\|L^{-1}Y - L^*X\|^2$. Plugging in $L_{2\times2}$ and $L_{2\times2}^{-1}$ from the Cholesky factorization described above, the metric implemented by the decoder would be, $$D = \left\| \frac{1}{\sqrt{h_{11}}\sqrt{h_{11}^{(2)}}} \begin{bmatrix} \sqrt{h_{11}^{(2)}} & 0 \\ -h_{12}^* & h_{11} \end{bmatrix} Y - \frac{1}{\sqrt{h_{11}}} \begin{bmatrix} h_{11} & 0 \\ h_{12}^* & \sqrt{h_{11}^{(2)}} \end{bmatrix}^* X \right\|^2 \quad (86)$$

Because $L^{-1}Y$ may be an input into the decoder (e.g., from signal processor 1412 in FIG. 14), the decoder may actually compute, $$D = \left\| y' - \frac{1}{\sqrt{h_{11}}} \begin{bmatrix} h_{11} & 0 \\ h_{12}^* & \sqrt{h_{11}^{(2)}} \end{bmatrix}^* X \right\|^2, \quad (87)$$

where $y' = L^{-1}Y$ is the input. To compute the LLR in equation (85), the decoding metric in equation (87) may be repeatedly computed using all the possible combinations of X. In this way, the decoder may determine the combination that produces the minimum values of equation (87) for b=1 and b=0. For a 2×2 64-QAM system, there are 64 possible values for each symbol in X. Therefore, the distance calculation, $\|L^{-1}Y - L^*X\|^2$, would be computed 64×64=4096 times.

Note that the decoding metric shown in equation (87) computes square roots, divisions, and multiplications. These may be computationally expensive operations, and may therefore be time intensive and/or complex in implementation. Furthermore, the metric may be computed repeatedly (e.g., 4096 times). Therefore, the effect of the complex/time-intensive computations may be magnified. The part of the calculation that is repeatedly computed is hereinafter referred to as the critical path. Accordingly, a different decoding strategy is provided in the present invention that reduces the complexity of the critical path. In particular, part of intensive calculations may be incorporated into a preprocessor (e.g., preprocessor 1400) or into the computation after the minimizing values of X are determined.

To reduce the complexity of the critical path, the decoding metric shown in equation (85) may be factored as follows:

$$D = \frac{1}{h_{11}h_{11}^{(2)}} \left\| \begin{bmatrix} \sqrt{h_{11}^{(2)}} & 0 \\ -h_{12}^* & h_{11} \end{bmatrix} Y - \sqrt{h_{11}^{(2)}} \begin{bmatrix} h_{11} & 0 \\ h_{12}^* & \sqrt{h_{11}^{(2)}} \end{bmatrix}^* X \right\|^2. \quad (88)$$

For simplicity, the factored decoding metric may be written as, $$D = \frac{1}{h_{11}h_{11}^{(2)}} \|\tilde{L}^{-1}Y - \sqrt{h_{11}^{(2)}}\tilde{L}^*X\|^2 \quad (89)$$

$$= \frac{1}{h_{11}h_{11}^{(2)}}\tilde{D}, \quad (90)$$

where $$\tilde{L}^{-1} = \begin{bmatrix} \sqrt{h_{11}^{(2)}} & 0 \\ -h_{12}^* & h_{11} \end{bmatrix}, \quad \tilde{L}^* = \begin{bmatrix} h_{11} & 0 \\ h_{12}^* & \sqrt{h_{11}^{(2)}} \end{bmatrix},$$

and $\tilde{D}$ is a simplified decoding metric. Therefore, the LLR may be expressed as, $$LLR = -\min_{b=0}\{\|L^{-1}Y - L^*X\|^2\} + \min_{b=1}\{\|L^{-1}Y - L^*X\|^2\} \quad (91)$$

$$= \frac{1}{h_{11}h_{11}^{(2)}}(-\min_{b=0}\{\tilde{D}\} + \min_{b=1}\{\tilde{D}\}). \quad (92)$$

Note that the simplified decoding metric may be repeatedly computed rather than the original decoding metric. Thus, the $$\frac{1}{h_{11}h_{11}^{(2)}}$$

calculation has been removed from the critical path, which has both a multiplication and division operation. Therefore, the complexity of the calculation in the critical path is reduced, but at the expense of increasing the final LLR calculation. However, fewer LLRs (e.g., 16 LLRs for a 2×2 64-QAM system) are typically calculated than distance calculations (e.g., 4096). Therefore, removing $$\frac{1}{h_{11}h_{11}^{(2)}}$$

from the critical path may still provide substantial time and/or complexity savings.

Furthermore, the $$\frac{1}{h_{11}h_{11}^{(2)}}$$

term used in the final LLR computation may not be needed until after the critical path calculations are completed. Therefore, $$\frac{1}{h_{11}h_{11}^{(2)}}$$

may be computed during the time that the time-intensive critical path calculations are being performed. Therefore, slow, but less complex multiplication and division implementations may be used without increasing the amount of time needed to compute the LLR. For example, the division operation may be implemented using a serial inversion mechanism.

In some embodiments, rather than computing the squared, simplified decoding metric, a linear approximation may be used. For example, the simplified decoding metric may be, $$\tilde{D}_{linear} = \|\hat{L}^{-1}Y - \sqrt{h_{11}^{(2)}}\tilde{L}*X\|, \quad (93)$$

which leaves out the squared term in the squared, simplified decoding metric. This approximation may reduce the complexity of the calculation within the critical path, and therefore may result in significant time and/or complexity savings in comparison to the squared version of the distance calculation.

If the linear distance metric in equation (93) is used as the decoding metric, the final LLR calculation may be updated to, $$LLR = \frac{1}{\sqrt{h_{11}}\sqrt{h_{11}^{(2)}}}\left(-\min_{b=0}\{\tilde{D}\} + \min\{\tilde{D}\}\right) \quad (94)$$

$$= \frac{1}{\sqrt{h_{11}}\sqrt{h_{11}^{(2)}}} LLR_{linear}. \quad (95)$$

Note that the complexity of the critical path has been reduced again at the expense of the complexity of the final LLR calculation. However, because the $$\frac{1}{\sqrt{h_{11}}\sqrt{h_{11}^{(2)}}}$$

term may be computed while the critical path calculations are computed, $$\frac{1}{\sqrt{h_{11}}\sqrt{h_{11}^{(2)}}}$$

may be implemented using techniques that may be low-complexity and time-intensive. Furthermore, if $$\frac{1}{\sqrt{h_{11}}\sqrt{h_{11}^{(2)}}}$$

is implemented in hardware, $\sqrt{h_{11}^{(2)}}$ and $\sqrt{h_{11}}$ may be computed using the same square root circuitry, thereby reducing the total amount of hardware.

Another benefit of implementing the linear decoding metric of equation (93) and the LLR of equation (94) is the fact that the computation is symbol-based rather than vector-based. That is, minimizing $\tilde{D}$ may involve determining values for all the symbols in X. However, minimizing $\tilde{D}_{linear}$ involves determining the minimum value for a single symbol in X. Therefore, a decoder using the linear metric may output results symbol-by-symbol, rather than in groups of symbols.

This may be beneficial when hard-decoding is used. Using hard-decoding, $LLR_{linear}$ may also be computed symbol-by-symbol, and may then be directly mapped to a hard decision. Thus, a $$\frac{1}{\sqrt{h_{11}}\sqrt{h_{11}^{(2)}}}$$

correction term may not be needed. Without having to compute a division operation and an extra square root operation, the complexity of the system may be further reduced considerably.

Referring now to FIG. 15, illustrative flow diagram 1500 is shown for decoding a signal vector based on a decoding metric. The signal vector decoded according to the steps of flow diagram 1500 can be a combined signal vector, such as the combined signal vector produced by combiner 1402 of FIG. 14. At step 1502, channel information can be preprocessed (e.g., by preprocessor 1400 of FIG. 14) for use in evaluating a simplified decoding metric. The simplified decoding metric may be derived from factoring a decoding metric. For example, the decoding metric may be $\|L^{-1}Y - L*X\|^2$, where $L*$ and $L^{-1}$ are shown above in equation (86). In this case, the simplified decoding metric may be $\tilde{D} = \|\hat{L}^{-1}Y - \sqrt{h_{11}^{(2)}}\tilde{L}*X\|^2$. The term factored out of the decoding metric may be $$\frac{1}{h_{11}h_{11}^{(2)}},$$

which may be referred to as a modifier value or simply a modifier. Alternatively, the simplified decoding metric may be $\tilde{D}_{linear} = \|\hat{L}^{-1}Y - \sqrt{h_{11}^{(2)}}\tilde{L}*X\|$, and the resulting modifier may be, $$\frac{1}{\sqrt{h_{11}}\sqrt{h_{11}^{(2)}}}.$$

Thus, the simplified decoding metric may be a function of signal vectors and channel characteristics, while the modifier may be a function of only the channel characteristics.

The channel preprocessing performed at step 1502 can reduce the amount or complexity of computation performed in the critical path. That is, channel preprocessing can compute, in advance of the operations in the critical path, any functions of channel information that would otherwise have been computed, possibly repeatedly, in the critical path. The preprocessors can compute any channel functions that are common to each evaluation of the simplified decoding metric for the different values of X. For example, if the simplified decoding metric is $\tilde{D}$ or $\tilde{D}_{linear}$, $$\hat{L}^{-1} = \begin{bmatrix} \sqrt{h_{11}^{(2)}} & 0 \\ -h_{12}^* & h_{11} \end{bmatrix} \text{ and } \tilde{L}^* = \begin{bmatrix} h_{11} & 0 \\ h_{12}^* & \sqrt{h_{11}^{(2)}} \end{bmatrix}$$

may be common to each evaluation of the simplified decoding metric. Therefore a channel preprocessor may compute $\sqrt{h_{11}^{(2)}}$ at step 1502 for use in evaluating the simplified decoding metric, which can also be used to compute the modifier.

With continuing reference to FIG. 15, at step 1504, a soft-bit information metric, such a log-likelihood ratio, can be computed based on the simplified decoding metric. Continuing the examples described above in step 1502, a soft-bit information metric can be computed in the form of an LLR using the simplified decoding metric, $\tilde{D}$, where $$LLR' = -\min_{b=0}\{\tilde{D}\} + \min_{b=1}\{\tilde{D}\}, \qquad (96)$$

Alternatively, a soft-bit metric can be computed using the linear simplified decoding metric, $\tilde{D}_{linear}$, according to, $$LLR'_{linear} = -\min_{b=0}\{\tilde{D}_{linear}\} + \min_{b=1}\{\tilde{D}_{linear}\}. \qquad (97)$$

The modifier can be computed at step 1506 substantially currently (e.g., in parallel) to step 1504. That is, while the simplified decoding metric is repeatedly computed for different possible values of X, the modifier can be computed. For the example described above, step 1506 may involve computing $$\frac{1}{h_{11}h_{11}^{(2)}}.$$

In this embodiment, the hardware (in a hardware implementation) can include a multiplier and a divider. Alternatively, step 1506 may involve computing $$\frac{1}{\sqrt{h_{11}}\sqrt{h_{11}^{(2)}}},$$

in which case the hardware may additionally include a square root circuit. In some embodiments, some of the resources used to perform step 1504 may also be used to perform operations in step 1506. As described above, because step 1504 may take a relatively long time to complete, any multiplier, divider, or square root circuit for computing step 1506 can be embodied in a slower and lower-complexity implementation.

At step 1508, the soft-bit information metric and the modifier can be combined to produce soft information corresponding to the transmitted digital sequence. The soft-bit information metric and the modifier may be combined by multiplying the two values. In these embodiments, R multipliers may be implemented to multiply the R soft-bit information metric by the modifier to create R final LLR values. This combining step may be computed following the critical path, and in a postprocessor.

Flow diagram 1500 can be used to decode a combined signal vector that advantageously pulls out as much computation as possible from the critical path. The computations are instead performed by preprocessors at step 1502 or by post-processors, at step 1508. Thus, computations that are repeatedly performed may have low-complexity and/or may be efficient.

Figure 16:
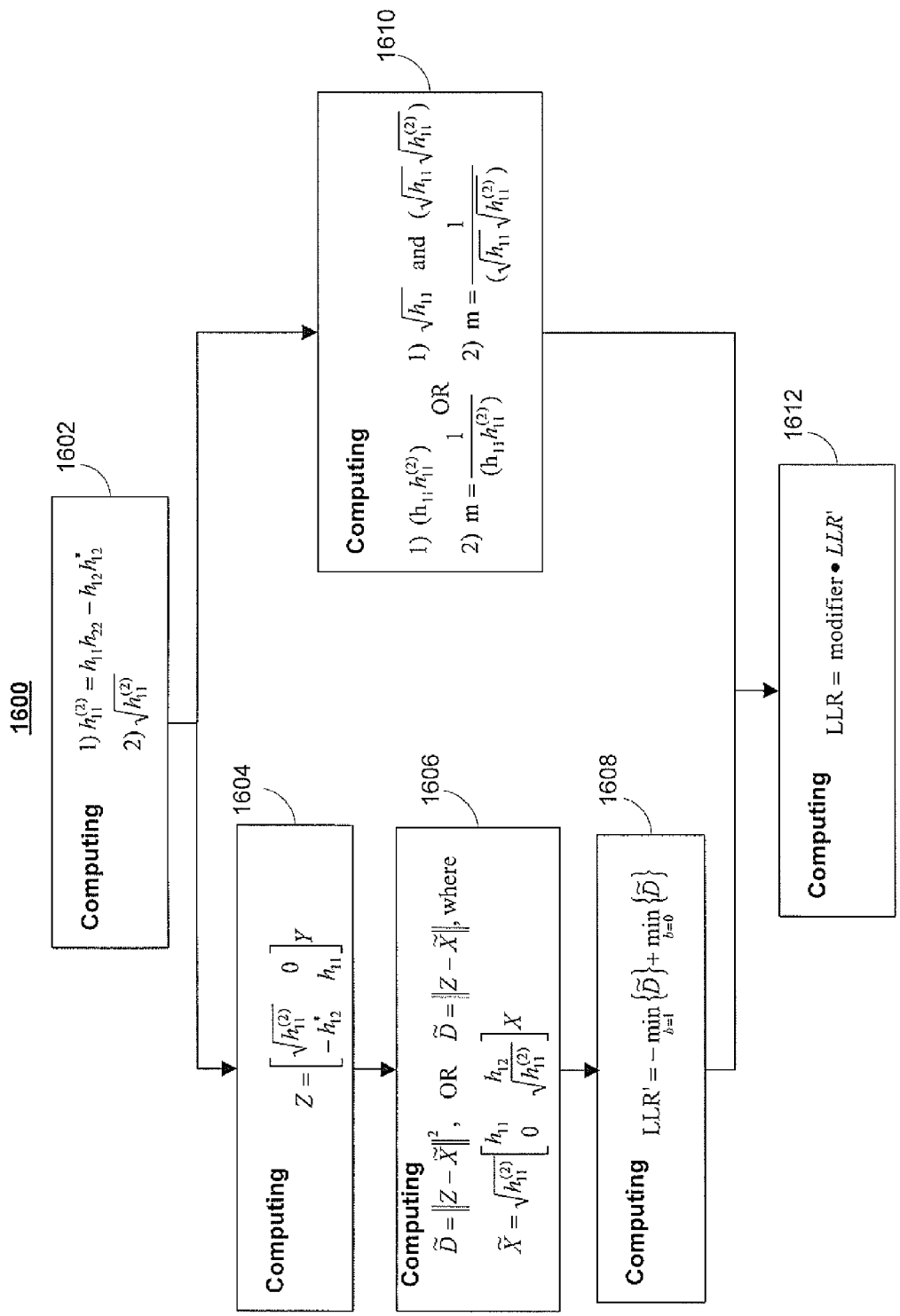
FIG. 16 shows an illustrative flow diagram for decoding a signal vector in a 2×2 MIMO system employing the strategy of FIG. 15.
Figure 17:
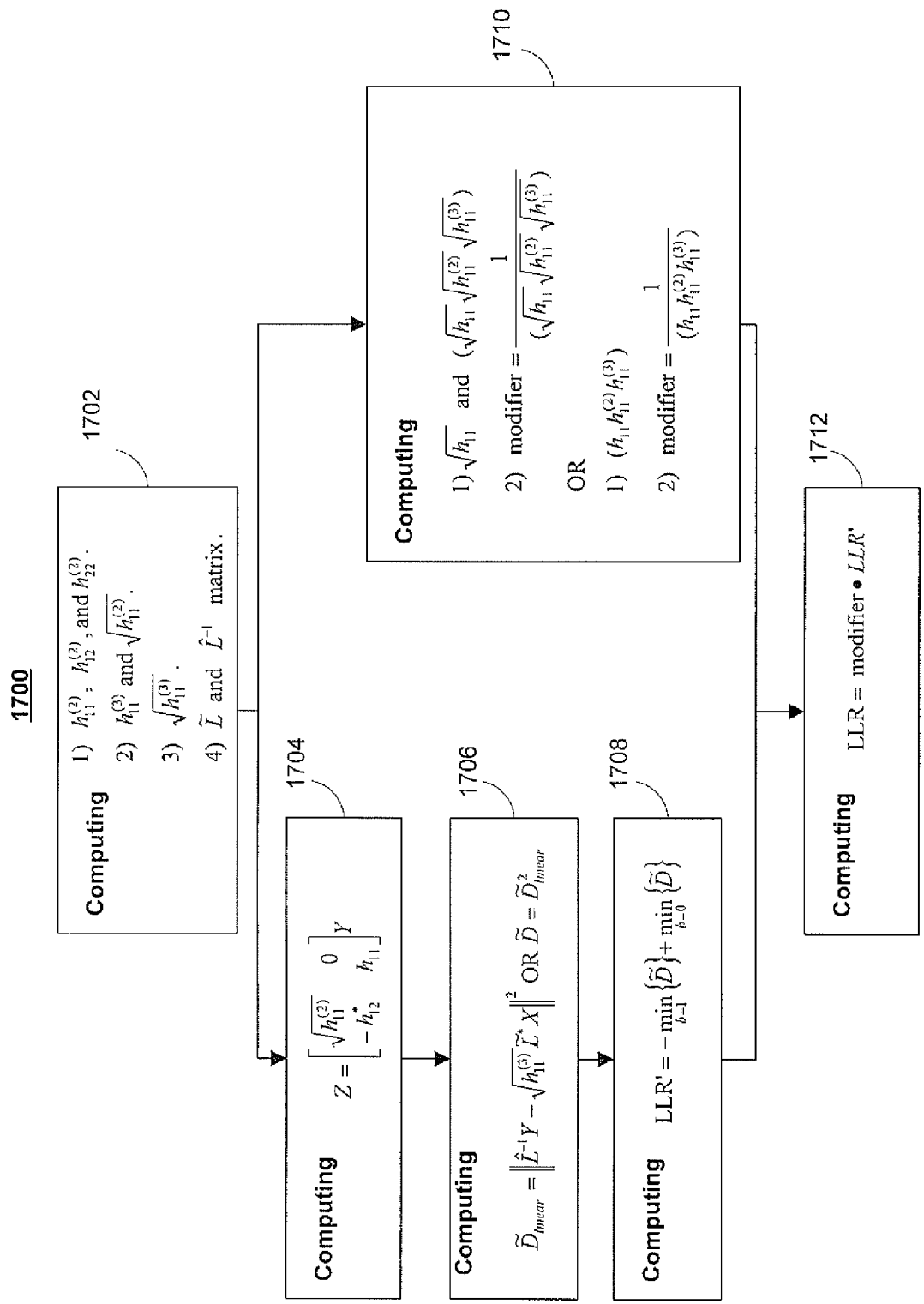
FIG. 17 shows an illustrative flow diagram for decoding a signal vector in a 3×3 MIMO system employing the strategy of FIG. 15.

Referring now to FIG. 16, flow diagram 1600 shows a more detailed, yet still simplified, illustration of decoding a combined signal vector in a 2×2 MIMO system in accordance with the decoding strategy of flow diagram 1500 (FIG. 15). At step 1602, calculations involved for determining $\hat{L}^{-1}$ and $\tilde{L}^*$ are computed. For a 2×2 system, where $$\hat{L}^{-1} = \begin{bmatrix} \sqrt{h_{11}^{(2)}} & 0 \\ -h_{12}^* & h_{11} \end{bmatrix} \text{ and } \tilde{L}^* = \begin{bmatrix} h_{11} & 0 \\ h_{12}^* & \sqrt{h_{11}^{(2)}} \end{bmatrix},$$

step 1602 may first involve determining $h_{11}^{(2)} = h_{11}h_{22} - h_{12}h_{12}^*$, and may then involve determining its square root, $\sqrt{h_{11}^{(2)}}$. These values may be determined by a channel pre-processor (e.g., preprocessor 1400 (FIG. 14)). At step 1604, a combined received signal vector, $\tilde{y}$, may be processed by multiplying the vector by $\hat{L}^{-1}$. The combined received signal vector may be obtained using MRC or any other suitable combining method, such as another form of weighted addition. The combined received signal vector may be obtained from a signal vector combiner, such as MRC combiner 1402 in FIG. 14. The multiplication by $\hat{L}^{-1}$ may be performed by a signal processor, such as signal processor 1412 in FIG. 14.

At step 1606, a simplified decoding metric, may be calculated for each possible combination of X. For a 2×2 system, the simplified decoding metric may be $\tilde{D} = \|\hat{L}^{-1}Y - \sqrt{h_{11}^{(2)}}\tilde{L}^*X\|^2$. Thus, at step 1606, $\sqrt{h_{11}^{(2)}}\tilde{L}^*$ may be multiplied by each valid common transmit signal vector, X, and the result from each multiplication may be used to determine the simplified decoding metric. Alternatively, the decoding metric may be a linear approximation of the simplified decoding metric, $\tilde{D}_{linear} = \|\hat{L}^{-1}Y - \sqrt{h_{11}^{(2)}}\tilde{L}^*X\|$. Step 1606 may therefore involve computing a suitable decoding metric many times (e.g., 4096 times for a 2×2, 64-QAM system, or 64 times for each symbol). Step 1606 may be performed by a maximum-likelihood decoder, such as by ML decoder 1404 in FIG. 14.

After calculating the decoding metric for each possible X, the minimizing values for b=1 and b=0 are used to determine a simplified LLR at step 1608. As described above, the simplified LLR may be determined by computing, $$LLR' = -\min_{b=0}\{\tilde{D}\} + \min_{b=1}\{\tilde{D}\}, \qquad (98)$$

or $LLR'_{linear}$. The simplified LLR may be computed by a maximum-likelihood decoder, such as by ML decoder 1404 in FIG. 14. At step 1612, the simplified LLR may be modified by a factor to compute the true LLR. In the 2×2 case, the factor may be $$\frac{1}{h_{11}h_{11}^{(2)}} \text{ or } \frac{1}{\sqrt{h_{11}}\sqrt{h_{11}^{(2)}}},$$

depending on which decoding metric is used. This factor may be determined by step 1610.

Step 1610 may be executed while steps 1604, 1606, and 1608 are being executed. Namely, step 1610 may be computed at any time while steps 1604, 1606 and 1608 are computed. Alternatively, step 1610 may be computed some time before or some time after the other steps. Step 1610 involves performing calculations that are not used by steps 1604, 1606, and 1608, but are used to compute the final LLR value. Thus, step 1610 may perform any suitable calculations that are used in calculations after the critical path (e.g., step 1612). For a 2×2 system, step 1610 may involve computing $h_{11}h_{11}^{(2)}$, and using the result to compute $$\frac{1}{h_{11}h_{11}^{(2)}}.$$

Alternatively, step 1610 may involve computing $\sqrt{h_{11}}$, then using the result to compute $\sqrt{h_{11}}\sqrt{h_{11}^{(2)}}$, and finally computing $$\frac{1}{\sqrt{h_{11}}\sqrt{h_{11}^{(2)}}}.$$

Recall that $\sqrt{h_{11}^{(2)}}$ has already been computed at step 1602. Thus, $\sqrt{h_{11}}$ may be computed using the same hardware, if applicable, as the hardware used to compute $\sqrt{h_{11}^{(2)}}$.

$$\frac{1}{h_{11}h_{11}^{(2)}} \quad \text{or} \quad \frac{1}{\sqrt{h_{11}}\sqrt{h_{11}^{(2)}}}$$

may be used by step 1610 to compute the final LLR, as described above. Step 1610 may be computed by a channel processor, such as preprocessor 1400 in FIG. 14.

The Cholesky factorization and decoding examples given above in connection with equations (76) through (95) FIGS. 15 and 16 have been for 2-input, 2-input MIMO systems. It should be understood, however, that the Cholesky factorization may be applied to any R-input, R-output MIMO system, and flow diagrams 1500 and 1600 may be utilized for any R-input, T-output MIMO system. To illustrate the above-described aspect of the present invention further, a full example for 3×3 $\tilde{H}$ will be described below in connection with FIG. 17 and equations (99) through (120).

A Cholesky factorization for a 3×3 combined channel matrix, $\tilde{H}$, is described herein. The components of $\tilde{H}$ may be represented by $h_{11}$, $h_{12}$, $h^*_{12}$, $h_{13}$, $h^*_{13}$, $h_{22}$, $h^*_{22}$, $h_{33}$, and $h^*_{22}$. Thus, the first matrix, $A^{(1)}$, may be given by, $$A^{(1)} = \tilde{H} = \begin{bmatrix} h_{11} & h_{12} & h_{13} \\ h^*_{12} & h_{22} & h_{23} \\ h^*_{13} & h^*_{23} & h_{33} \end{bmatrix}. \tag{99}$$

In accordance with equation (73), variables $a^{(1)}$, $b^{(1)}$, and $B^{(1)}$ may take on the following values:

$$a^{(1)} = h_{11}, \tag{100}$$

$$b^{(1)} = \begin{bmatrix} h^*_{12} \\ h^*_{13} \end{bmatrix}, \text{ and} \tag{101}$$

$$B^{(1)} = \begin{bmatrix} h_{22} & h_{23} \\ h^*_{23} & h_{33} \end{bmatrix}. \tag{102}$$

The first step in the Cholesky recursive algorithm involves determining $A^{(2)}$ and $L_1$ using equations (74) and (75), respectively. Accordingly, $A^{(2)}$ and $L_1$ may be given by, $$A^{(2)} = \begin{bmatrix} I_1 & 0 \\ 0 & B^{(1)} - \frac{1}{h_{11}}b^{(1)}b^{(1)*} \end{bmatrix} \tag{103}$$

$$= \begin{bmatrix} 1 & 0 & 0 \\ 0 & \frac{1}{h_{11}}h_{11}^{(2)} & \frac{1}{h_{11}}h_{12}^{(2)} \\ 0 & \frac{1}{h_{11}}h_{12}^{(2)*} & \frac{1}{h_{11}}h_{22}^{(2)} \end{bmatrix} \text{ and}$$

$$L_1 = \begin{bmatrix} \sqrt{a^{(1)}} & 0 \\ \frac{1}{\sqrt{a^{(1)}}}b^{(1)} & I_2 \end{bmatrix} = \begin{bmatrix} \sqrt{h_{11}} & 0 & 0 \\ \frac{h^*_{12}}{\sqrt{h_{11}}} & 1 & 0 \\ \frac{h^*_{13}}{\sqrt{h_{11}}} & 0 & 1 \end{bmatrix}, \tag{104}$$

where $h_{11}^{(2)} = h_{11}h_{22} - h^*_{12}h_{12}$, $h_{12}^{(2)} = h_{11}h_{23} - h^*_{12}h_{13}$, and $h_{22}^{(2)} = h_{11}h_{33} - h^*_{13}h_{13}$.

After determining $A^{(2)}$, the second step in the Cholesky algorithm involves determining $A^{(3)}$ and $L_2$ using equations (74) and (75) once again. First, from equation (73), variables $a^{(2)}$, $b^{(2)}$, and $B^{(2)}$ may take on the following values:

$$a^{(2)} = \frac{1}{h_{11}}h_{11}^{(2)}, \tag{105}$$

$$b^{(2)} = \frac{1}{h_{11}}h_{12}^{(2)*}, \text{ and} \tag{106}$$

$$B^{(2)} = \frac{1}{h_{11}}h_{22}^{(2)}. \tag{107}$$

Therefore, $A^{(3)}$ and $L_2$ may be given by, $$A^{(3)} = \begin{bmatrix} I_2 & 0 \\ 0 & B^{(2)} - \frac{1}{\frac{1}{h_{11}}h_{11}^{(2)}}b^{(2)}b^{(2)*} \end{bmatrix} \tag{108}$$

$$= \begin{bmatrix} 1 & 0 & 0 \\ 0 & 1 & 0 \\ 0 & 0 & \frac{1}{h_{11}}\frac{1}{h_{11}^{(2)}}(h_{11}^{(2)}h_{22}^{(2)} - h_{12}^{(2)*}h_{12}^{(2)}) \end{bmatrix}$$

$$\equiv \begin{bmatrix} 1 & 0 & 0 \\ 0 & 1 & 0 \\ 0 & 0 & \frac{1}{h_{11}}\frac{1}{h_{11}^{(2)}}(h_{11}^{(3)}) \end{bmatrix}, \tag{109}$$

and $$L_2 = \begin{bmatrix} I_1 & 0 & 0 \\ 0 & \sqrt{a^{(2)}} & 0 \\ 0 & \sqrt{a^{(2)}}b^{(2)} & I_1 \end{bmatrix} = \begin{bmatrix} 1 & 0 & 0 \\ 0 & \frac{1}{\sqrt{h_{11}}}\sqrt{h_{11}^{(2)}} & 0 \\ 0 & \frac{1}{\sqrt{h_{11}}}\frac{h_{12}^{(2)*}}{\sqrt{h_{11}^{(2)}}} & 1 \end{bmatrix}, \tag{110}$$

where $h_{11}^{(3)} = h_{11}^{(2)}h_{22}^{(2)} - h_{12}^{(2)*}h_{12}^{(2)}$.

After determining $A^{(3)}$, the third and final step in the Cholesky algorithm involves calculating $A^{(4)}$ and $L_3$. In accordance with equation (73), $A^{(3)}$ may be written as, $$H^{(3)} = \begin{bmatrix} 1 & 0 & 0 \\ 0 & 1 & 0 \\ 0 & 0 & \frac{1}{h_{11}}\frac{1}{h_{11}^{(2)}}(h_{11}^{(3)}) \end{bmatrix} = \begin{bmatrix} I_2 & 0 \\ 0 & a^{(3)} \end{bmatrix}. \quad (111)$$

Thus, $A^{(4)}$ and $L_3$ may be expressed as, $$A^{(4)} = [I_3] = \begin{bmatrix} 1 & 0 & 0 \\ 0 & 1 & 0 \\ 0 & 0 & 1 \end{bmatrix}, \text{ and} \quad (112)$$

$$L_3 = \begin{bmatrix} 1 & 0 & 0 \\ 0 & 1 & 0 \\ 0 & 0 & \sqrt{a^{(3)}} \end{bmatrix} = \begin{bmatrix} 1 & 0 & 0 \\ 0 & 1 & 0 \\ 0 & 0 & \frac{1}{\sqrt{h_{11}}}\frac{1}{\sqrt{h_{11}^{(2)}}}\sqrt{h_{11}^{(3)}} \end{bmatrix}. \quad (113)$$

As expected at the final step of the Cholesky algorithm, the matrix $A^{(4)} = A^{(R+1)}$, is the identity matrix.

The lower triangular matrix, L, where $\tilde{H} = LL^*$, may be determined following the recursive algorithm described above. In general, L is determined by multiplying $L_1, \ldots, L_P$. Thus, for the 3×3 case, L may be calculated by multiplying $L_1$, $L_2$, and $L_3$. Thus, $$L = L_1 L_2 L_3 \quad (114)$$

$$= \frac{1}{\sqrt{h_{11}}} \frac{1}{\sqrt{h_{11}^{(2)}}} \begin{bmatrix} \sqrt{h_{11}^{(2)}} h_{11} & 0 & 0 \\ \sqrt{h_{11}^{(2)}} h_{12}^* & h_{11}^{(2)} & 0 \\ \sqrt{h_{11}^{(2)}} h_{13}^* & h_{12}^{(2)*} & \sqrt{h_{11}^{(3)}} \end{bmatrix}$$

$$\equiv \frac{1}{\sqrt{h_{11}}} \frac{1}{\sqrt{h_{11}^{(2)}}} \cdot \tilde{L}, \quad (115)$$

where $$\tilde{L} = \begin{bmatrix} \sqrt{h_{11}^{(2)}} h_{11} & 0 & 0 \\ \sqrt{h_{11}^{(2)}} h_{12}^* & h_{11}^{(2)} & 0 \\ \sqrt{h_{11}^{(2)}} h_{13}^* & h_{12}^{(2)*} & \sqrt{h_{11}^{(3)}} \end{bmatrix}. \quad (116)$$

The inverse of L, or $L^{-1}$, may also be calculated by computing the inverses of $L_1$, $L_2$, $L_3$, and multiplying them in reverse order. That is, $$L^{-1} = L_3^{-1} L_2^{-1} L_1^{-1} \quad (116)$$

$$= \frac{1}{\sqrt{h_{11}}} \frac{1}{\sqrt{h_{11}^{(2)}}} \frac{1}{\sqrt{h_{11}^{(3)}}} \begin{bmatrix} \sqrt{h_{11}^{(2)}}\sqrt{h_{11}^{(3)}} & 0 & 0 \\ -h_{12}^*\sqrt{h_{11}^{(3)}} & h_{11}\sqrt{h_{11}^{(3)}} & 0 \\ -h_{13}^*h_{11}^{(2)} + h_{12}^*h_{12}^{(2)*} & -h_{11}h_{12}^{(2)} & h_{11}h_{11}^{(2)} \end{bmatrix} \quad (117)$$

$$= \frac{1}{\sqrt{h_{11}}} \frac{1}{\sqrt{h_{11}^{(2)}}} \frac{1}{\sqrt{h_{11}^{(3)}}} \hat{L}^{-1}. \quad (118)$$

where $$\hat{L}^{-1} = \begin{bmatrix} \sqrt{h_{11}^{(2)}}\sqrt{h_{11}^{(3)}} & 0 & 0 \\ -h_{12}^*\sqrt{h_{11}^{(3)}} & h_{11}\sqrt{h_{11}^{(3)}} & 0 \\ -h_{13}^*h_{11}^{(2)} + h_{12}^*h_{12}^{(2)*} & -h_{11}h_{12}^{(2)} & h_{11}h_{11}^{(2)} \end{bmatrix}. \quad (119)$$

If the combined channel matrix is 3×3, a preprocessor may compute the 3×3 Cholesky algorithm, as described above in connection with equations (99) through (119). Alternatively, a preprocessor may have equations for one or more factorizations, or equivalent representations of the equations, hard-coded or hard-wired. For example, the preprocessor may hard-code or hard-wire equations (114) and (117).

FIG. 17 shows illustrative flow diagram 1700 for decoding a combined received signal vector from a 3×3 MIMO system in accordance with the decoding strategy of flow diagram 1500 (FIG. 15). At step 1702, processing is performed on components of the combined channel response matrix that will be used to calculate a simplified decoding metric. In particular, processing may be performed to determine the $\tilde{L}$ and $\hat{L}^{-1}$ matrices, shown in equations (116) and (119). First, $h_{11}^{(2)} = h_{11}h_{22} - h_{12}^* h_{12}$, $h_{12}^{(2)} = h_{11}h_{23} - h_{12}^* h_{13}$, and $h_{22}^{(2)} = h_{11}h_{33} - h_{13}^* h_{13}$, defined in the first step of the Cholesky factorization, may be determined. Using the results, $h_{11}^{(3)} = h_{11}^{(2)} h_{22}^{(2)} - h_{12}^{(2)*} h_{12}^{(2)}$, defined in the second stop of the Cholesky factorization, may be calculated. Also, the square root of $h_{11}^{(2)}$, $\sqrt{h_{11}^{(2)}}$, may be calculated in parallel. Following the determination of $h_{11}^{(3)}$, the square root of $h_{11}^{(3)}$, $\sqrt{h_{11}^{(3)}}$, may also be calculated. In some embodiments, the square root circuitry (if applicable) used to calculate $\sqrt{h_{11}^{(2)}}$ may be used to calculate $\sqrt{h_{11}^{(3)}}$. Finally, using the results of the above calculations, the $\tilde{L}$ and $\hat{L}^{-1}$ matrices may be constructed. Namely, the non-zero components of $\tilde{L}$ and $\hat{L}^{-1}$ (which are $\sqrt{h_{11}^{(2)}}\sqrt{h_{11}^{(3)}}$, $-h_{12}^*\sqrt{h_{11}^{(3)}}$, $h_{11}\sqrt{h_{11}^{(3)}}$, $-h_{13}^* h_{11}^{(2)} + h_{12}^* h_{12}^{(2)*}$, $-h_{11}h_{12}^{(2)}$, and $h_{11}h_{11}^{(2)}$) may be calculated. Note that no division operation is required in any of the above calculations. For at least this reason, the calculations performed in step 1702 may be considerably less complex than any channel processing that would have been necessary using the original decoding metric. In some embodiments, the channel processing calculations described above may be performed by a channel preprocessor (e.g., preprocessor 1400 in FIG. 14).

At step 1704, a combined received signal vector $\tilde{y}$, may be processed by multiplying the vector by $\hat{L}^{-1}$, determined from step 1702. The combined received signal vector may be obtained using MRC or any other suitable combining method, such as another form of weighted addition. The combined received signal vector may be obtained from a signal vector combiner, such as MRC combiner 1402 in FIG. 14. The multiplication by $\hat{L}^{-1}$ may be performed by a signal processor, such as signal processor 1412 in FIG. 14.

At step 1706, a simplified decoding metric may be calculated for each possible combination of X. For a 3×3 system, the simplified decoding metric may be $\tilde{D} = \|\hat{L}^{-1}Y - \sqrt{h_{11}^{(3)}}\tilde{L}*X\|^2$, where $h_{11}^{(3)} = h_{11}^{(2)} h_{22}^{(2)} - h_{12}^{(2)*} h_{12}^{(2)}$ and $\tilde{L}$ and $\hat{L}^{-1}$ are given by equations (116) and (119), respectively. Thus, at step 1706, $\sqrt{h_{11}^{(3)}}\tilde{L}*$ may be multiplied by each valid common transmit signal vector, X, and the result from each multiplication may be used to determine the simplified decoding metric. Alternatively, the decoding metric may be a linear approximation of the simplified decoding metric, $\tilde{D}_{linear} = \|\hat{L}^{-1}Y - \sqrt{h_{11}^{(3)}}\tilde{L}*X\|$. Step 1706 may therefore involve computing a suitable decoding metric many times (e.g., 64×64×64=262,144 times for a 3×3, 64-QAM system, or 64 times for each symbol). Step 1706 may be performed by a maximum-likelihood decoder, such as by ML decoder 1404 in FIG. 14.

After calculating the decoding metric for each possible X, the minimizing values for b=1 and b=0 are used to determine a simplified LLR at step 1708. The simplified LLR may be determined by computing, $$LLR' = -\min_{b=0}\{\tilde{D}\} + \min_{b=1}\{\tilde{D}\}, \quad (120)$$

or LLR'$_{linear}$. The simplified LLR may be computed by a maximum-likelihood decoder, such as by ML decoder 1404 in FIG. 14. At step 1712, simplified LLR may be modified by a factor to compute the true LLR. In the 3×3 case, the factor may be $$\frac{1}{h_{11}h_{11}^{(2)}h_{11}^{(3)}} \text{ or } \frac{1}{\sqrt{h_{11}}\sqrt{h_{11}^{(2)}}\sqrt{h_{11}^{(3)}}},$$

depending on which decoding metric is used. This factor may be determined at step 1710.

Step 1710 may be executed while steps 1704, 1706, and 1708 are being executed. Namely, step 1710 may be computed at any time while steps 1704, 1706 and 1708 are computed. Alternatively, step 1710 may be computed some time before or some time after the other steps. Step 1710 involves performing calculations that are not used by steps 1704, 1706, and 1708, but are used to compute the final LLR value. Thus, step 1710 may perform any suitable calculations that are used in calculations after the critical path (e.g., step 1712). For a 3×3 system, step 1710 may involve computing $h_{11}h_{11}^{(2)}h_{11}^{(3)}$, and using the result to compute $$\frac{1}{h_{11}h_{11}^{(2)}h_{11}^{(3)}}.$$

Alternatively, step 1710 may involve computing $\sqrt{h_{11}}$, then using the result to compute $\sqrt{h_{11}}\sqrt{h_{11}^{(2)}}\sqrt{h_{11}^{(3)}}$, and finally computing $$\frac{1}{\sqrt{h_{11}}\sqrt{h_{11}^{(2)}}\sqrt{h_{11}^{(3)}}}.$$

Recall that $\sqrt{h_{11}^{(2)}}$ and $\sqrt{h_{11}^{(3)}}$ have already been computed at step 1702. $\sqrt{h_{11}}$ may therefore be computed using the same hardware, if applicable, as the hardware used to compute $\sqrt{h_{11}^{(2)}}$ and/or $\sqrt{h_{11}^{(3)}}$.

$$\frac{1}{h_{11}h_{11}^{(2)}h_{11}^{(3)}} \text{ or } \frac{1}{\sqrt{h_{11}}\sqrt{h_{11}^{(2)}}\sqrt{h_{11}^{(3)}}}$$

may be used by step 1710 to compute the final LLR, as described above. Step 1710 may be computed by a channel processor, such as preprocessor 1400 in FIG. 14.

As previously discussed above in the 2×2 example, the decoding implementation shown above has many advantages. Firstly, the division operation is left out of the critical path, and may be performed at substantially the same time as the critical path calculations. Therefore, the division operation may be implemented using a slow, but low-complexity algorithm, such as a serial inversion mechanism. Furthermore, the square root operations are left out of the critical path, which may again allow a receiver designer to lower the complexity of the square root implementations.

Secondly, if the linear simplified decoding metric is used, the decoding may be symbol-based. That is, the decoder may output estimates of each symbol rather than the entire signal vector. If hard-decisions are used, the simplified LLR determined symbol-by-symbol is sufficient to map each symbol to a hard decision. Thus, the modifier is no longer needed, and steps 1710 and 1712 may be completely omitted. Therefore, division operations are not necessary, nor are any final multipliers to compute the true LLR.

Generally, a decoding metric with Cholesky factorization, $\|L^{-1}\tilde{y}_N - L^*x\|^2$, for an R×R MIMO system may be factored into a squared, simplified decoding metric, $\tilde{D} = \|\hat{L}^{-1}Y - \sqrt{h_{11}^{(R)}}\hat{L}^*X\|^2$, and modifier, $$\frac{1}{\prod_{i=1}^{R}\sqrt{h_{11}^{(R)}}},$$

where $h_{11}^{(1)} = h_{11}$. Alternatively, the decoding metric may be factored into a linear, simplified decoding metric, $\tilde{D} = \|\hat{L}^{-1}Y - \sqrt{h_{11}^{(R)}}\hat{L}^*X\|$, and modifier, $$\frac{1}{\prod_{i=1}^{R}\sqrt{h_{11}^{(R)}}},$$

where $h_{11}^{(1)} = h_{11}$. Derivations of the equations for 2×2 and 3×3 MIMO systems were given above. Decoding of a signal vector for a general R-input, R-output MIMO system may be performed using the steps shown in FIG. 15, and may have any of the features described above in connection with the 2×2 and 3×3 examples of FIG. 16 and FIG. 17.

Referring now to FIGS. 18A-18G, various exemplary implementations of the present invention are shown.

Figure 18A:
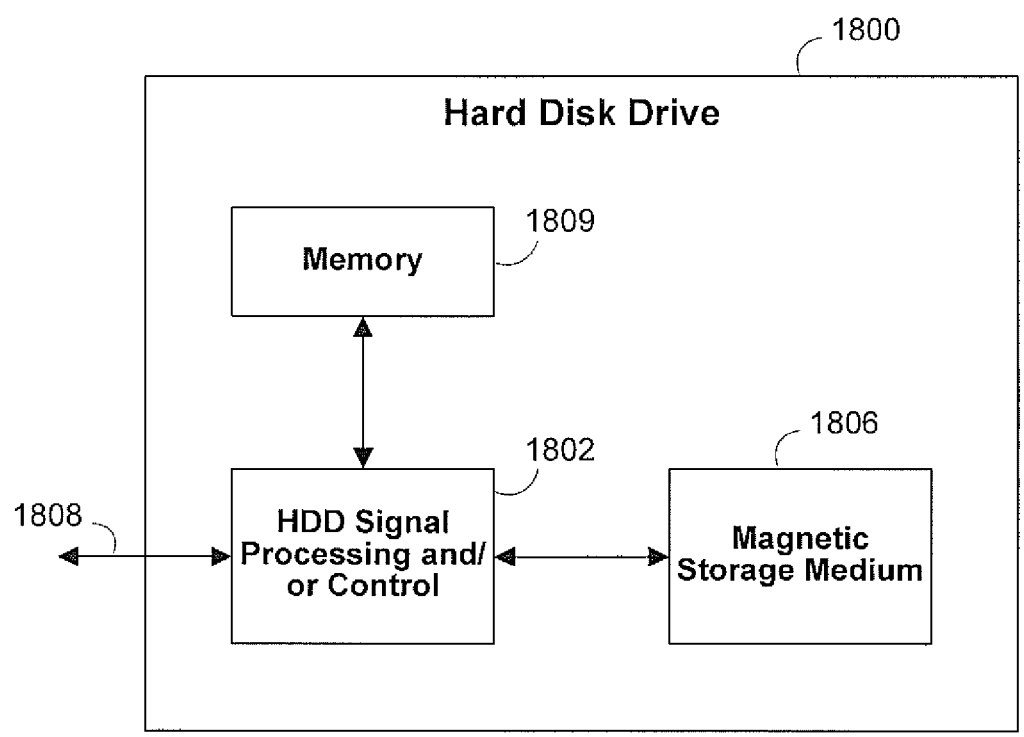
FIG. 18A is a block diagram of an exemplary hard disk drive that can employ the disclosed technology.

Referring now to FIG. 18A, the present invention can be implemented in a hard disk drive 1800. The present invention may implement either or both signal processing and/or control circuits, which are generally identified in FIG. 18A at 1802. In some implementations, the signal processing and/or control circuit 1802 and/or other circuits (not shown) in the HDD 1800 may process data, perform coding and/or encryption, perform calculations, and/or format data that is output to and/or received from a magnetic storage medium 1806.

The HDD 1800 may communicate with a host device (not shown) such as a computer, mobile computing devices such as personal digital assistants, cellular phones, media or MP3 players and the like, and/or other devices via one or more wired or wireless communication links 1808. The HDD 1800 may be connected to memory 1809 such as random access memory (RAM), low latency nonvolatile memory such as flash memory, read only memory (ROM) and/or other suitable electronic data storage.

Figure 18B:
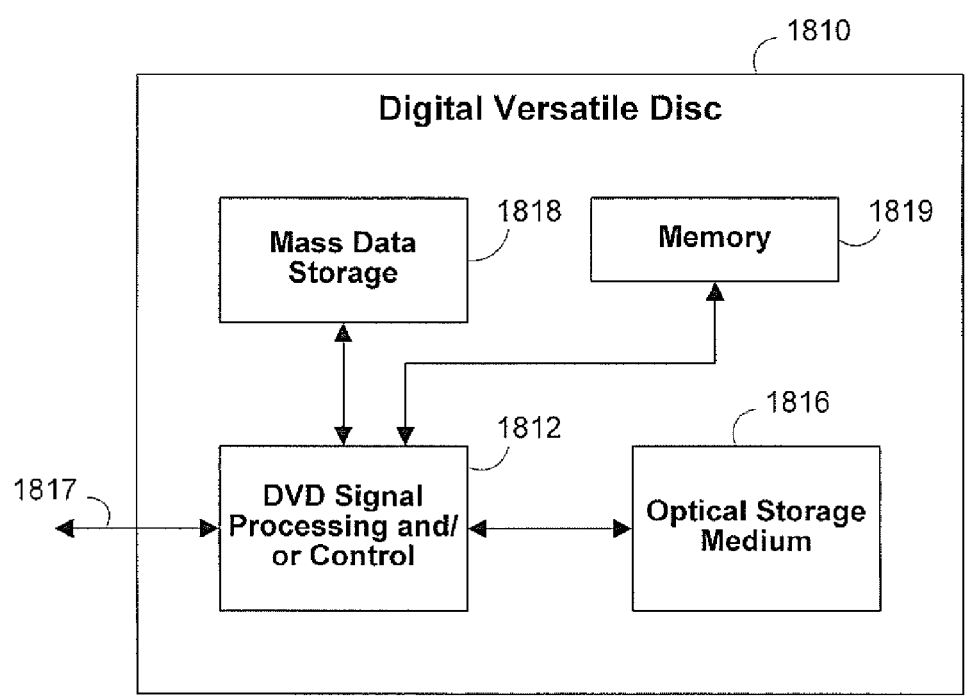
FIG. 18B is a block diagram of an exemplary digital versatile disc that can employ the disclosed technology.

Referring now to FIG. 18B, the present invention can be implemented in a digital versatile disc (DVD) drive 1810. The present invention may implement either or both signal processing and/or control circuits, which are generally identified in FIG. 18B at 1812, and/or mass data storage of the DVD drive 1810. The signal processing and/or control circuit 1812 and/or other circuits (not shown) in the DVD 1810 may process data, perform coding and/or encryption, perform calculations, and/or format data that is read from and/or data written to an optical storage medium 1816. In some implementations, the signal processing and/or control circuit 1812 and/or other circuits (not shown) in the DVD 1810 can also perform other functions such as encoding and/or decoding and/or any other signal processing functions associated with a DVD drive.

The DVD drive 1810 may communicate with an output device (not shown) such as a computer, television or other device via one or more wired or wireless communication links 1817. The DVD 1810 may communicate with mass data storage 1818 that stores data in a nonvolatile manner. The mass data storage 1818 may include a hard disk drive (HDD). The HDD may have the configuration shown in FIG. 18A. The HDD may be a mini HDD that includes one or more platters having a diameter that is smaller than approximately 1.8". The DVD 1810 may be connected to memory 1819 such as RAM, ROM, low latency nonvolatile memory such as flash memory and/or other suitable electronic data storage.

Figure 18C:
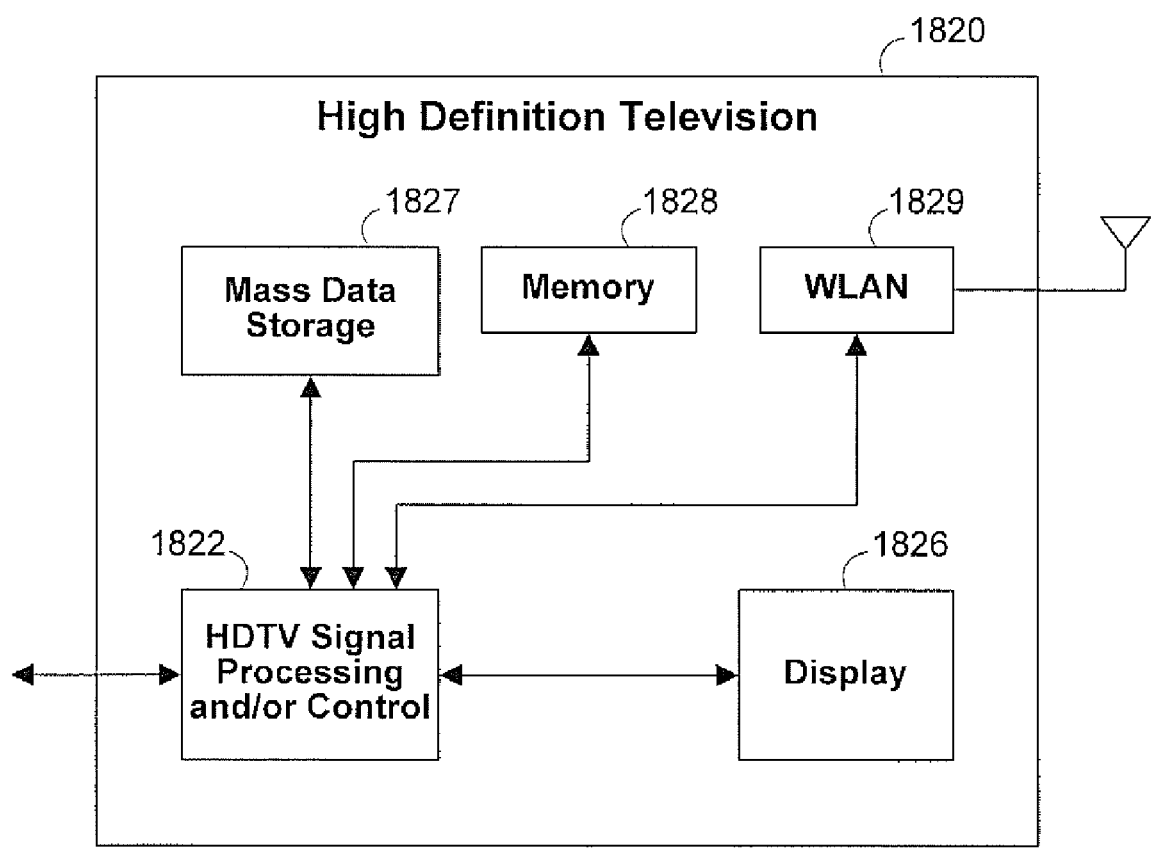
FIG. 18C is a block diagram of an exemplary high definition television that can employ the disclosed technology.

Referring now to FIG. 18C, the present invention can be implemented in a high definition television (HDTV) 1820. The present invention may implement either or both signal processing and/or control circuits, which are generally identified in FIG. 18C at 1822, a wireless local area network (WLAN) interface and/or mass data storage of the HDTV 1820. The HDTV 1820 receives HDTV input signals in either a wired or wireless format and generates HDTV output signals for a display 1826. In some implementations, signal processing circuit and/or control circuit 1822 and/or other circuits (not shown) of the HDTV 1820 may process data, perform coding and/or encryption, perform calculations, format data and/or perform any other type of HDTV processing that may be required.

The HDTV 1820 may communicate with mass data storage 1827 that stores data in a nonvolatile manner such as optical and/or magnetic storage devices for example hard disk drives HDD and/or DVDs. At least one HDD may have the configuration shown in FIG. 18A and/or at least one DVD may have the configuration shown in FIG. 18B. The HDD may be a mini HDD that includes one or more platters having a diameter that is smaller than approximately 1.8". The HDTV 1820 may be connected to memory 1828 such as RAM, ROM, low latency nonvolatile memory such as flash memory and/or other suitable electronic data storage. The HDTV 1820 also may support connections with a WLAN via a WLAN network interface 1829.

Figure 18D:
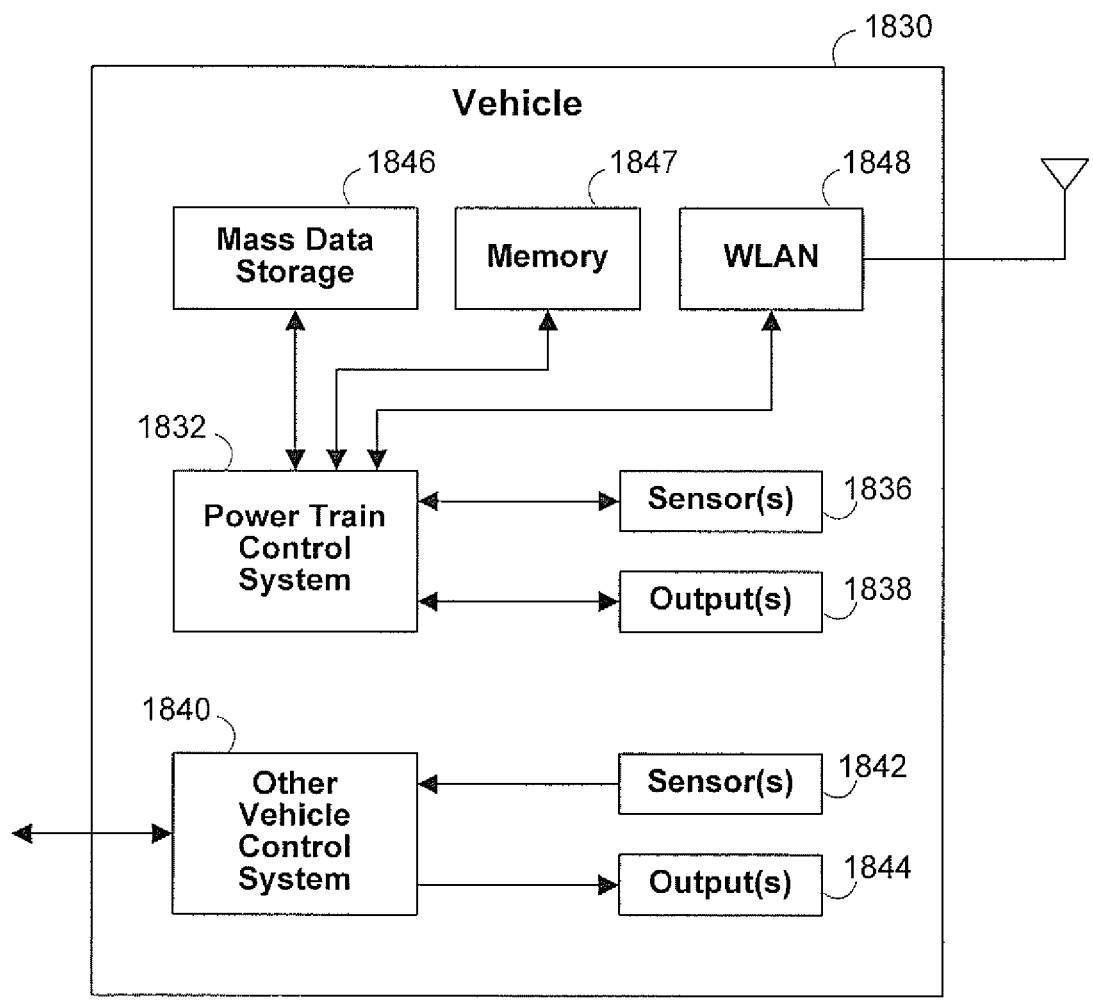
FIG. 18D is a block diagram of an exemplary vehicle that can employ the disclosed technology.

Referring now to FIG. 18D, the present invention implements a control system of a vehicle 1830, a WLAN interface and/or mass data storage of the vehicle control system. In some implementations, the present invention may implement a powertrain control system 1832 that receives inputs from one or more sensors 1836, such as temperature sensors, pressure sensors, rotational sensors, airflow sensors and/or any other suitable sensors, and/or that generates one or more output control signals such as engine operating parameters, transmission operating parameters, and/or other control signals, which may be provided to one or more output devices 1838.

The present invention may also be implemented in other control systems 1840 of the vehicle 1830. The control system 1840 may likewise receive signals from input sensors 1842 and/or output control signals to one or more output devices 1844. In some implementations, the control system 1840 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1832 may communicate with mass data storage 1846 that stores data in a nonvolatile manner. The mass data storage 1846 may include optical and/or magnetic storage devices for example hard disk drives HDD and/or DVDs. At least one HDD may have the configuration shown in FIG. 18A and/or at least one DVD may have the configuration shown in FIG. 18B. The HDD may be a mini HDD that includes one or more platters having a diameter that is smaller than approximately 1.8". The powertrain control system 1832 may be connected to memory 1847 such as RAM, ROM, low latency nonvolatile memory such as flash memory and/or other suitable electronic data storage. The powertrain control system 1832 also may support connections with a WLAN via a WLAN network interface 1848. The control system 1840 may also include mass data storage, memory and/or a WLAN interface (all not shown).

Figure 18E:
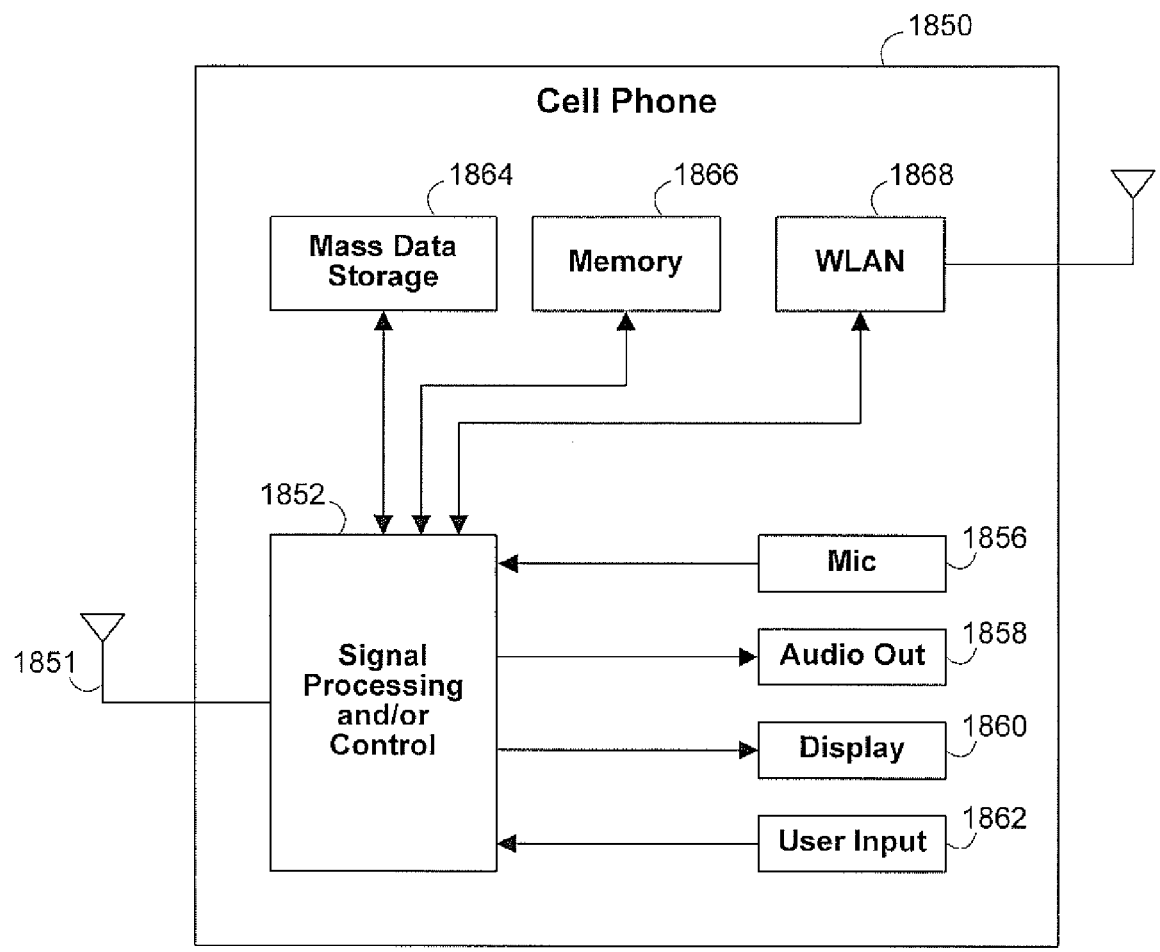
FIG. 18E is a block diagram of an exemplary cell phone that can employ the disclosed technology.

Referring now to FIG. 18E, the present invention can be implemented in a cellular phone 1850 that may include a cellular antenna 1851. The present invention may implement either or both signal processing and/or control circuits, which are generally identified in FIG. 18E at 1852, a WLAN interface and/or mass data storage of the cellular phone 1850. In some implementations, the cellular phone 1850 includes a microphone 1856, an audio output 1858 such as a speaker and/or audio output jack, a display 1860 and/or an input device 1862 such as a keypad, pointing device, voice actuation and/or other input device. The signal processing and/or control circuits 1852 and/or other circuits (not shown) in the cellular phone 1850 may process data, perform coding and/or encryption, perform calculations, format data and/or perform other cellular phone functions.

The cellular phone 1850 may communicate with mass data storage 1864 that stores data in a nonvolatile manner such as optical and/or magnetic storage devices for example hard disk drives HDD and/or DVDs. At least one HDD may have the configuration shown in FIG. 18A and/or at least one DVD may have the configuration shown in FIG. 18B. The HDD may be a mini HDD that includes one or more platters having a diameter that is smaller than approximately 1.8". The cellular phone 1850 may be connected to memory 1866 such as RAM, ROM, low latency nonvolatile memory such as flash memory and/or other suitable electronic data storage. The cellular phone 1850 also may support connections with a WLAN via a WLAN network interface 1868.

Figure 18F:
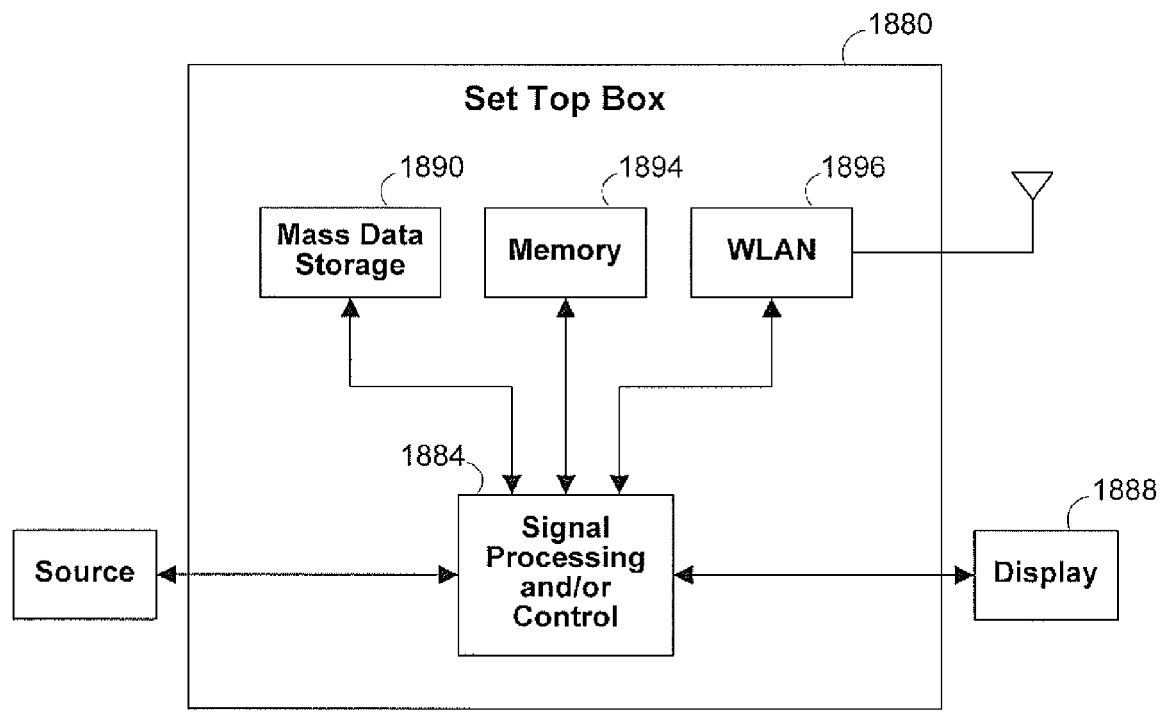
FIG. 18F is a block diagram of an exemplary set top box that can employ the disclosed technology.

Referring now to FIG. 18F, the present invention can be implemented in a set top box 1880. The present invention may implement either or both signal processing and/or control circuits, which are generally identified in FIG. 18F at 1884, a WLAN interface and/or mass data storage of the set top box 1880. The set top box 1880 receives signals from a source such as a broadband source and outputs standard and/or high definition audio/video signals suitable for a display 1888 such as a television and/or monitor and/or other video and/or audio output devices. The signal processing and/or control circuits 1884 and/or other circuits (not shown) of the set top box 1880 may process data, perform coding and/or encryption, perform calculations, format data and/or perform any other set top box function.

The set top box 1880 may communicate with mass data storage 1890 that stores data in a nonvolatile manner. The mass data storage 1890 may include optical and/or magnetic storage devices for example hard disk drives HDD and/or DVDs. At least one HDD may have the configuration shown in FIG. 18A and/or at least one DVD may have the configuration shown in FIG. 18B. The HDD may be a mini HDD that includes one or more platters having a diameter that is smaller than approximately 1.8". The set top box 1880 may be connected to memory 1894 such as RAM, ROM, low latency nonvolatile memory such as flash memory and/or other suitable electronic data storage. The set top box 1880 also may support connections with a WLAN via a WLAN network interface 1896.

Figure 18G:
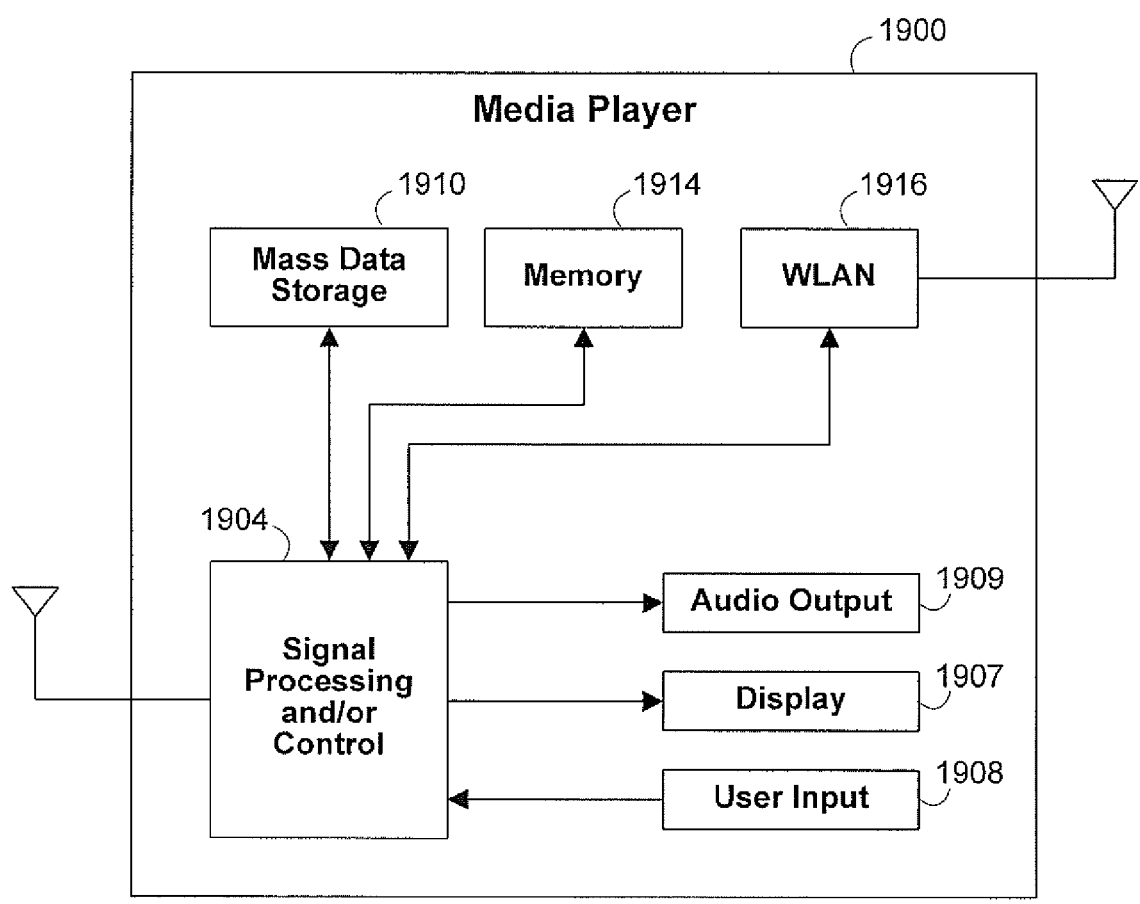
FIG. 18G is a block diagram of an exemplary media player that can employ the disclosed technology.

Referring now to FIG. 18G, the present invention can be implemented in a media player 1960. The present invention may implement either or both signal processing and/or control circuits, which are generally identified in FIG. 18G at 1904, a WLAN interface and/or mass data storage of the media player 1900. In some implementations, the media player 1900 includes a display 1907 and/or a user input 1908 such as a keypad, touchpad and the like. In some implementations, the media player 1900 may employ a graphical user interface (GUI) that typically employs menus, drop down menus, icons and/or a point-and-click interface via the display 1907 and/or user input 1908. The media player 1900 further includes an audio output 1909 such as a speaker and/or audio output jack. The signal processing and/or control circuits 1904 and/or other circuits (not shown) of the media player 1900 may process data, perform coding and/or encryption, perform calculations, format data and/or perform any other media player function.

The media player 1900 may communicate with mass data storage 1910 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 18A and/or at least one DVD may have the configuration shown in FIG. 18B. The HDD may be a mini HDD that includes one or more platters having a diameter that is smaller than approximately 1.8". The media player 1900 may be connected to memory 1914 such as RAM, ROM, low latency nonvolatile memory such as flash memory and/or other suitable electronic data storage. The media player 1900 also may support connections with a WLAN via a WLAN network interface 1916. Still other implementations in addition to those described above are contemplated.

The foregoing describes systems and methods for decoding a signal vector, where the receiver may obtain receive multiple instances of the same transmit signal vector. The above described embodiments of the present invention are presented for the purposes of illustration and not of limitation. Furthermore, the present invention is not limited to a particular implementation. The invention may be implemented in hardware, such as on an application specific integrated circuit (ASIC) or on a field-programmable gate array (FPGA). The invention may also be implement in software.

What is claimed is:

1. A method for decoding a signal vector in a multiple-input multiple-output transmission scheme, comprising:
    receiving multiple signal vectors corresponding to a common transmit signal vector, wherein each of the received signal vectors is associated with a channel response matrix;
    combining the multiple received signal vectors into a combined received signal vector;
    combining the channel response matrices into a combined channel response matrix;
    processing the combined received signal vector using a noise whitening function derived from the combined channel response matrix; and
    decoding the processed combined received signal vector based on the combined channel response matrix.

2. The method of claim 1, wherein combining the multiple received signal vectors into a combined received signal vector comprises multiplying each of the received signal vectors by a conjugate transpose of a respective channel response matrix and summing the results.

3. The method of claim 2, wherein combining the channel response matrices into a combined channel response matrix comprises multiplying each of the channel response matrices by a conjugate transpose of a respective channel response matrix and summing the results.

4. The method of claim 1, wherein processing the combined received signal vector using a noise whitening function derived from the combined channel response matrix comprises multiplying the combined received signal vector by a processed version of the combined channel response matrix.

5. The method of claim 4, wherein the processed version of the combined channel response matrix is produced by calculating a square root of the combined channel response matrix.

6. The method of claim 1, wherein decoding the processed combined received signal vector comprises calculating the metric $x^*_N \tilde{H}_N x_N - 2R\{x^*_N \tilde{y}_N\}$, where $x_N$ is the common transmit signal vector, $x^*_N$ is a conjugate transpose of $x_N$, $\tilde{H}_N$ is the combined channel response matrix, and $\tilde{y}_N$ is the combined received signal vector.

7. The method of claim 1 further comprising performing QR decomposition on a square root of the combined channel response matrix.

8. The method of claim 7, wherein decoding the processed combined received signal vector comprises calculating a metric $\|Q^*R^{-1}Q^*\tilde{y}_N - Rx\|^2$ using decomposed matrices Q and R, where x is the common transmit signal vector and $\tilde{y}_N$ is the combined received signal vector.

9. The method of claim 1 further comprising performing Cholesky factorization on the combined channel response matrix.

10. The method of claim 9, wherein decoding the processed combined received signal vector comprises calculating a metric $\|L^{-1}\tilde{y}_N - L^*x\|^2$, where x is the common transmit signal vector, $\tilde{y}_N$ is the combined received signal vector, and L is a matrix produced by the Cholesky factorization.

11. A system for decoding a signal vector in a multiple-input multiple-output transmission scheme, comprising:
    a receiver configured to receive multiple signal vectors corresponding to a common transmit signal vector, wherein each of the received signal vectors is associated with a channel response matrix;
    a vector combiner configured to combine the multiple received signal vectors into a combined received signal vector;
    a matrix combiner configured to combine the channel response matrices into a combined channel response matrix;

a signal processor configured to process the combined received signal vector using a noise whitening function derived from the combined channel response matrix; and a decoder configured to decode the processed combined received signal vector based on the combined channel response matrix.

12. The system of claim 11, wherein the vector combiner combines the multiple received signal vectors by multiplying each of the received signal vectors by a conjugate transpose of a respective channel response matrix and summing the results.

13. The system of claim 12, wherein the matrix combiner combines the channel response matrices by multiplying each of the channel response matrices by a conjugate transpose of a respective channel response matrix and summing the results.

14. The system of claim 11, wherein the signal processor processes the combined received signal vector by multiplying the combined received signal vector by a processed version of the combined channel response matrix.

15. The system of claim 14, wherein the signal processor produces the processed version of the combined channel response matrix by calculating a square root of the combined channel response matrix.

16. The system of claim 11, wherein the decoder decodes the processed combined received signal vector by calculating the metric $x^*_N \tilde{H}_N x_N - 2R(x^*_N \tilde{y}_N)$, where $x_k$ is the common transmit signal vector, $x^*_N$ is a conjugate transpose of $x_N$, $\tilde{H}_N$ is the combined channel response matrix, and $\tilde{y}_N$ is the combined received signal vector.

17. The system of claim 11, wherein the decoder is further configured to perform QR decomposition on a square root of the combined channel response matrix.

18. The system of claim 17, wherein the decoder decodes the processed combined received signal vector by calculating a metric $\|Q^* R^{-1} Q^* \tilde{y}_N - Rx\|^2$ using decomposed matrices Q and R, where x is the common transmit signal vector and $\tilde{y}_N$ is the combined received signal vector.

19. The system of claim 11, wherein the decoder is further configured to perform Cholesky factorization on the combined channel response matrix.

20. The system of claim 19, wherein the decoder decodes the processed combined received signal vector by calculating a metric $\|L^{-1} \tilde{y}_N - L^* x\|^2$, where x is the common transmit signal vector, $\tilde{y}_N$ is the combined received signal vector, and L is a matrix produced by the Cholesky factorization.

* * * * *